United States Patent
Ausserlechner

(10) Patent No.: US 11,592,319 B2
(45) Date of Patent: Feb. 28, 2023

(54) INDUCTIVE ANGLE SENSOR

(71) Applicant: Infineon Technologies AG, Neubiberg (DE)

(72) Inventor: Udo Ausserlechner, Villach (AT)

(73) Assignee: Infineon Technologies AG, Neubiberg (DE)

(*) Notice: Subject to any disclaimer, the term of this patent is extended or adjusted under 35 U.S.C. 154(b) by 349 days.

(21) Appl. No.: 17/003,186

(22) Filed: Aug. 26, 2020

(65) Prior Publication Data

US 2021/0063206 A1 Mar. 4, 2021

(30) Foreign Application Priority Data

Aug. 30, 2019 (DE) .......... 102019213174.3

(51) Int. Cl.
  *G01D 5/22* (2006.01)
  *G01B 7/30* (2006.01)
(52) U.S. Cl.
  CPC .......... *G01D 5/2291* (2013.01); *G01B 7/30* (2013.01)
(58) Field of Classification Search
  CPC ........ G01B 7/30; G01D 3/028; G01D 5/2291; G01D 5/2053
  See application file for complete search history.

(56) References Cited

U.S. PATENT DOCUMENTS

| | | |
|---|---|---|
| 4,159,644 A | 7/1979 | Svala |
| 4,223,300 A | 9/1980 | Wiklund |
| 6,384,598 B1 | 5/2002 | Hobein et al. |
| 2013/0187639 A1* | 7/2013 | Sasaki ............. G01B 7/30 324/207.17 |
| 2019/0011285 A1 | 1/2019 | Utermoehlen et al. |
| 2019/0072414 A1* | 3/2019 | Utermoehlen ...... G01D 5/208 |
| 2022/0057281 A1* | 2/2022 | Ausserlechner ..... G01D 5/2053 |

FOREIGN PATENT DOCUMENTS

| | | |
|---|---|---|
| CN | 103868450 A | 6/2014 |
| CN | 107036634 A | 8/2017 |
| CN | 107407576 A | 11/2017 |
| DE | 10012202 C2 | 11/2002 |
| EP | 1312889 A2 | 5/2003 |
| EP | 2884237 A1 | 6/2015 |

* cited by examiner

*Primary Examiner* — Jermele M Hollington
*Assistant Examiner* — Suresh K Rajaputra
(74) *Attorney, Agent, or Firm* — Harrity & Harrity, LLP

(57) ABSTRACT

An inductive angle sensor for determining a rotational position of a rotor relative to a stator includes an exciter coil, at least one pickup coil arrangement having an m-fold symmetry and at least one conductive target having an m-fold symmetry. The exciter coil may excite the conductive target which, in turn, may induce an induced signal in the pickup coil arrangement. A signal analysis device may determine the rotational position of the rotor based on the induced signal. The inductive angle sensor may comprise a second pickup coil arrangement having an n-fold symmetry and a second conductive target having an n-fold symmetry. The exciter coil may excite the second conductive target which, in turn, may induce a second induced signal in the second pickup coil arrangement. The signal analysis device may determine the rotational position of the rotor based on the two induced signals according to a Vernier principle.

27 Claims, 11 Drawing Sheets

INDUCTIVE ANGLE SENSOR

RELATED APPLICATION

This application claims priority to German Patent Application No. 102019213174.3, filed on Aug. 30, 2019, which is incorporated herein by reference in its entirety.

FIELD

Embodiments of the present disclosure relate to an inductive angle sensor comprising a rotor and a stator, wherein a relative rotational displacement between the rotor and the stator may be determined using an inductive principle. Some exemplary embodiments may relate to particular geometrical symmetries of one or more targets comprised by the rotor, and some exemplary embodiments may relate to astatic arrangements comprised by the stator and/or by the rotor, respectively.

BACKGROUND

Inductive position sensors in general may be used for determining a relative displacement between two members being movable relative to each other, wherein the determination of the relative displacement is based on the principle of electrical induction. For example, inductive angle sensors may determine a relative linear displacement or a relative rotational displacement between two members. In the latter case, a first member may comprise a stator and a second member may comprise a rotor being rotatable relative to the stator.

In order to make use of the electrical induction principle, the stator may comprise an exciter coil which is fed with an alternating current. Accordingly, the stator generates an alternating magnetic field. The rotor may comprise a target coil, wherein the alternating magnetic field induces eddy currents in the target coil which results in a magnetic flux. Furthermore, the stator comprises a pickup coil. The aforementioned magnetic flux induces an induction cur-rent in the pickup coil. Phase and magnitude of the induction current depend on the relative position between the rotor and the stator. Thus, a relative angular displacement between the rotor and the stator can be derived from the phase and magnitude of the measured in-duction current.

These inductive angle sensors are relatively robust against environmental influences, e.g. they may still work well even in dusty and harsh conditions. Furthermore, they may provide a good indication of the relative angular displacement between the rotor and the stator. However, they may be prone to interference with external magnetic fields. Furthermore, they may only have a limited resolution with respect to their angular measurement range. Still further, the relation between the phase and the magnitude of the measured induction current may be ambiguous over a full revolution of 360°. That is, certain pairs of values (phase, magnitude) may occur more than once over a full revolution of 360° which makes the determination of the angular displacement ambiguous since it renders an uncertainty to the determined angular displacement.

Thus, it would be desirable to improve inductive angle sensors so that they may provide for a precise high resolution of the angular displacement, for a robustness against external magnetic fields and for an unambiguous measurement of the angular displacement between the rotor and the stator.

Thus, it is suggested to provide an inductive angle sensor having the features of independent claim 1, and to provide and inductive angle sensor having the features of independent claim 19. Further exemplary and preferred embodiments are given in the dependent claims.

A first aspect concerns an inductive angle sensor comprising a stator and a rotor being rotationally movable relative to each other around a rotational axis. The stator may comprise an exciter coil, a first pickup coil arrangement and a second pickup coil arrangement. The first pickup coil arrangement may comprise an m-fold symmetry. The second pickup coil arrangement may comprise an n-fold symmetry. Said m-fold and n-fold symmetries will be described in more detail further below. However, according to this aspect, the integer numbers m and n are different from each other and they do not have a common divisor except 1. The rotor may comprise a target arrangement comprising a first conductive target and a second conductive target. The first and second conductive targets may be vertically stacked atop each other along the rotational axis. The first conductive target may comprise an m-fold symmetry corresponding to the m-fold symmetry of the first pickup coil arrangement. The second conductive target may comprise an n-fold symmetry corresponding to the n-fold symmetry of the second pickup coil arrangement. The exciter coil may be excitable with an alternating current. The alternating current may induce a first induction current in the first conductive target resulting in a first magnetic flux with a periodicity of 360°/m. The alternating current may further induce a second induction current in the second conductive target resulting in a second magnetic flux with a periodicity of 360°/n. The first magnetic flux with the periodicity of 360°/m may induce a first induced signal in the first pickup coil arrangement having the m-fold symmetry and the second magnetic flux with the periodicity of 360°/n may induce a second induced signal in the second pickup coil arrangement having the n-fold symmetry. The inductive angle sensor may further comprise a signal analysis device for determining a rotational position of the rotor based on the first and second induced signals.

A second aspect concerns an inductive angle sensor comprising a stator and a rotor being rotationally movable relative to each other along a rotational axis. The stator may comprise an exciter coil and at least one pickup coil arrangement comprising an m-fold symmetry. The rotor may comprise a secondary coil and a target arrangement comprising at least a first conductive target having an m-fold symmetry corresponding to the m-fold symmetry of the at least one pickup coil arrangement. The exciter coil may be excitable with an alternating current for inductively coupling an induction current into the secondary coil. The secondary coil may be electrically coupled with the target arrangement, and in particular with the first conductive target, such that the induction current results in a magnetic flux with a periodicity of 360°/m in the first conductive target. The magnetic flux with the periodicity of 360°/m may induce an induced signal in the at least one pickup coil arrangement having the m-fold symmetry. The inductive angle sensor may further comprise a signal analysis device for determining a rotational position of the rotor based on the induced signal. According to this aspect, the first conductive target may be astatic.

SUMMARY

Embodiments provide an inductive angle sensor that includes a stator and a rotor being rotationally movable relative to each other around a rotational axis; and a signal analysis device. The stator including an exciter coil, a first pickup coil arrangement, and a second pickup coil arrangement, wherein the first pickup coil arrangement includes an m-fold symmetry, and wherein the second pickup coil arrangement includes an n-fold symmetry, wherein m and n being different and do not have a common divisor except 1, wherein the rotor includes a target arrangement including a first conductive target and a second conductive target, the first and second conductive targets being vertically stacked along the rotational axis, the first conductive target including an m-fold symmetry corresponding to the m-fold symmetry of the first pickup coil arrangement, and the second conductive target including an n-fold symmetry corresponding to the n-fold symmetry of the second pickup coil arrangement, wherein the exciter coil is excitable with an alternating current, the alternating current inducing a first induction current in the first conductive target resulting in a first magnetic flux with a periodicity of 360°/m and inducing a second induction current in the second conductive target resulting in a second magnetic flux with a periodicity of 360°/n, and wherein the first magnetic flux with the periodicity of 360°/m induces a first induced signal in the first pickup coil arrangement having the m-fold symmetry and the second magnetic flux with the periodicity of 360°/n induces a second induced signal in the second pickup coil arrangement having the n-fold symmetry. The signal analysis device is configured to determine a rotational position of the rotor based on the first and the second induced signals.

Embodiments provide an inductive angle sensor that includes a stator and a rotor being rotationally movable relative to each other around a rotational axis; and a signal analysis device. The stator includes an exciter coil and at least one pickup coil arrangement including an m-fold symmetry, the rotor including a secondary coil and a target arrangement including at least a first conductive target having an m-fold symmetry corresponding to the m-fold symmetry of the at least one pickup coil arrangement, wherein the exciter coil is excitable with an alternating current for inductively coupling an induction current into the secondary coil, wherein the secondary coil is electrically coupled with the first conductive target such that the induction current results in a magnetic flux with a periodicity of 360°/m in the first conductive target, and wherein the magnetic flux with the periodicity of 360°/m induces an induced signal in the at least one pickup coil arrangement having the m-fold symmetry. The signal analysis device is configured to determine a rotational position of the rotor based on the induced signal. The first conductive target is astatic.

BRIEF DESCRIPTION OF THE DRAWINGS

In the following, embodiments of the present disclosure are described in more detail with reference to the figures, in which.

DETAILED DESCRIPTION

Figure 1:
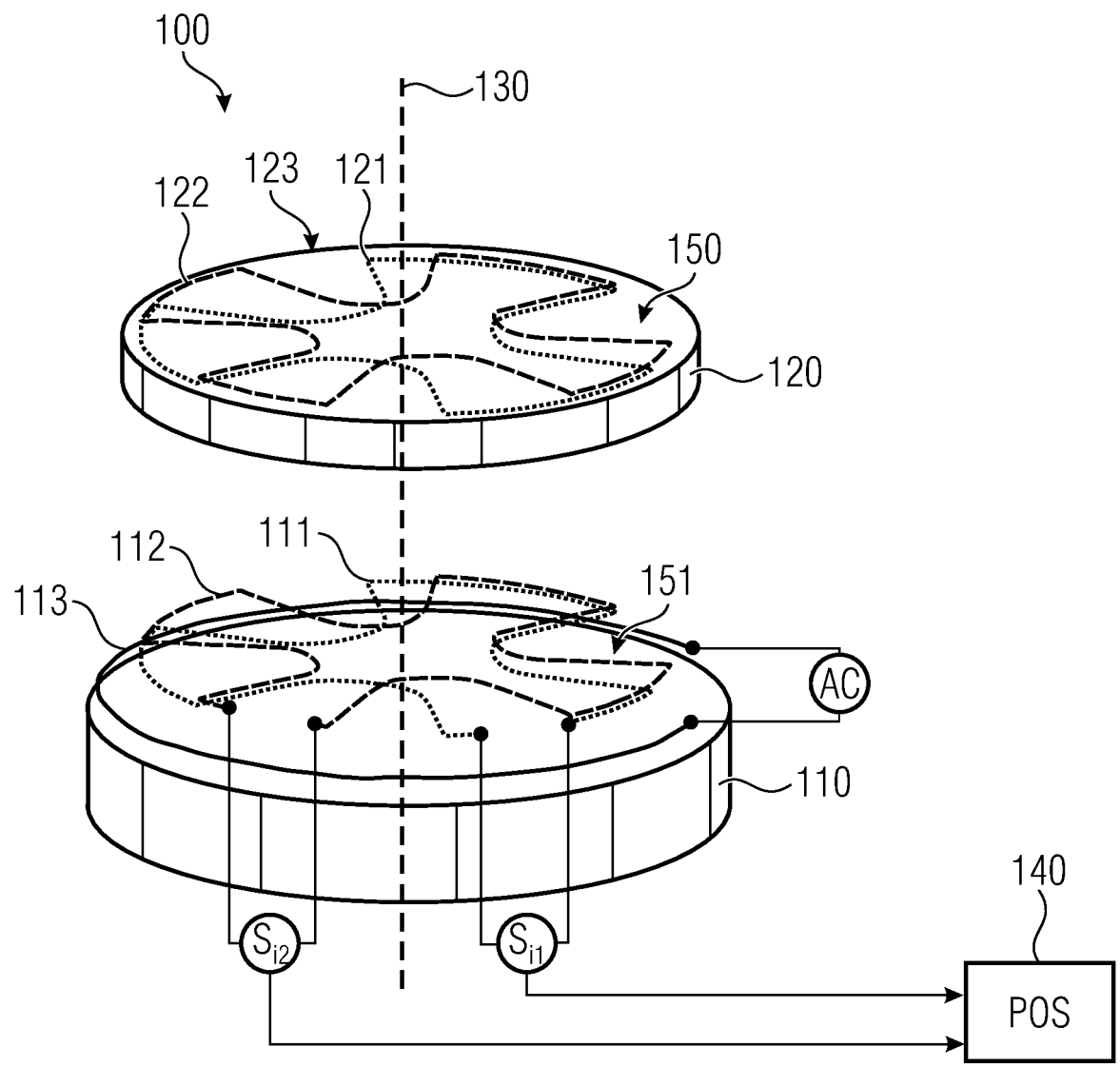
FIG. 1 shows a block diagram of an inductive angle sensor according to an embodiment.

Equal or equivalent elements or elements with equal or equivalent functionality are denoted in the following description by equal or equivalent reference numerals.

Method steps which are depicted by means of a block diagram and which are described with reference to said block diagram may also be executed in an order different from the depicted and/or described order. Furthermore, method steps concerning a particular feature of a device may be replaceable with said feature of said device, and the other way around.

As an introduction to the principles described herein, a brief definition of the term "k-fold symmetry" shall be given: A shape may have a k-fold symmetry if it can be rotated around an axis by 360°*x/k (with x being an arbitrary integer) such that it looks the same.

FIG. 1 shows an exemplary embodiment of an inductive angle sensor 100 according to a first aspect. The inductive angle sensor 100 may comprise a stator 110 and a rotor 120 being rotationally movable relative to each other around a rotational axis 130.

The stator 110 may comprise an exciter coil 113 (red), a first pickup coil arrangement 111 (dark blue) and a second pickup coil arrangement 112 (cyan). The first pickup coil arrangement 111 may comprise an m-fold symmetry, i.e. it can be rotated around the rotational axis 130 by 360°*x/m (with x being an arbitrary integer) such that it looks the same. The second pickup coil arrangement 112 may comprise an n-fold symmetry, i.e. it can be rotated around the rotational axis 130 by 360°*x/n (with x being an arbitrary integer) such that it looks the same.

In the non-limiting example as depicted in FIG. 1, the first pickup coil arrangement 111 (dark blue) may have a 3-fold symmetry, while the second pickup coil arrangement 112 (cyan) may have a 4-fold symmetry.

According to the innovative principle as described herein, the variables m and n are different from each other and they do not have a common divisor except 1. This is an important information since, as will be described in more detail below, this is one of the reasons why the first pickup coil arrangement 111 and the second pickup coil arrangement 112 may not or nearly not interfere with each other. For example, m=n+1.

The exciter coil 113 may comprise an annular, and in particular round or circular, outline. The exciter coil 113 may be arranged on the stator 110 coaxially with the rotational axis 130. The first pickup coil arrangement 111 and the second pickup coil arrangement 112 may also comprise an outline that is generally annular, and in particular round or circular, which may optionally comprise indentations or openings 151 extending towards the rotational axis 130. The first and second pickup coil arrangements 111, 112 may be arranged on the stator 110 coaxially with the rotational axis 130.

The rotor 120 may comprise a target arrangement 123. The target arrangement 123 may comprise a first conductive target 121 (dark blue) and a second conductive target 122 (cyan). The first and second conductive targets 121, 122 may be vertically stacked atop each other along the rotational axis 130. The first conductive target 121 may comprise an m-fold symmetry corresponding to the m-fold symmetry of the first pickup coil arrangement 111. The second conductive target 122 may comprise an n-fold symmetry corresponding to the n-fold symmetry of the second pickup coil arrangement 112. This is an important information since, as will be described in more detail below, this is one of the reasons why the first conductive target 121 and the second conductive target 122 may not or nearly not interfere with each other, and also one of the reasons why the first conductive target 121 may interfere with the first pickup coil arrangement 111 but (nearly) not with the second pickup coil arrangement 112 and why the second conductive target 122 may interfere with the second pickup coil arrangement 112 but (nearly) not with the first pickup coil arrangement 111.

In the non-limiting example as depicted in FIG. 1, the first conductive target 121 (dark blue) may have a 3-fold symmetry, while the second conductive target 122 (cyan) may have a 4-fold symmetry.

The first conductive target 121 and the second conductive target 122 may also comprise an outline that is generally annular, and in particular round or circular, which may optionally comprise indentations or openings 150 extending towards the rotational axis 130. The first and second conductive targets 121, 122 may be arranged on the rotor 120 coaxially with the rotational axis 130.

The exciter coil 113 may be fed with an alternating current $I_{AC}$. The alternating current $I_{AC}$ may induce a first induction current in the first conductive target 121 resulting in a first magnetic flux with a periodicity of 360°/m. Furthermore, the alternating current $I_{AC}$ may induce a second induction current in the second conductive target 122 resulting in a second magnetic flux with a periodicity of 360°/n.

The first magnetic flux with the periodicity of 360°/m may induce a first induced signal $S_{i1}$ in the first pickup coil arrangement 111 having the m-fold symmetry. The second magnetic flux with the periodicity of 360°/n may induce a second induced signal $S_{i2}$ in the second pickup coil arrangement 112 having the n-fold symmetry.

The inductive angle sensor 100 may further comprise a signal analysis device 140 for determining a rotational position of the rotor 120 relative to the stator 110 based on the first and second induced signals $S_{i1}$, $S_{i2}$.

As mentioned above, the present innovative principle is based on the finding that the first conductive target 121 may interfere with the first pickup coil arrangement 111 and may induce the first induced signal $S_{i1}$ in the first pickup coil arrangement 111. However, the first conductive target 121 may (nearly) not interfere with the second pickup coil arrangement 112 and may therefore not induce any relevant induced signals in the second pickup coil arrangement 112. At the same time, the second conductive target 122 may interfere with the second pickup coil arrangement 112 and may induce the second induced signal $S_{i2}$ in the second pickup coil arrangement 112. However, the second conductive target 122 may (nearly) not interfere with the first pickup coil arrangement 111 and may therefore not induce any relevant induced signals in the first pickup coil arrangement 111.

This is due to the fact that the first pickup coil arrangement 111 and the first target 121 may comprise the same m-fold symmetry, while the second pickup coil arrangement 112 and the second target 122 may comprise the same n-fold symmetry, wherein the integer numbers m and n are different from each other and they do not have a common divisor except 1.

As mentioned above, the exciter coil 113 may be fed with an alternating current or an alternating voltage, respectively. For example, the exciter coil 113 may be fed with a sine-shaped alternating voltage at a frequency $f_0$. This frequency $f_0$ may be referred to as a carrier frequency. For example, the carrier frequency $f_0$ may comprise values between 100 kHz and 10 MHz, e.g. 4 MHz±10%.

The induced signals $S_{i1}$, $S_{i2}$ may be amplitude-modulated carrier frequency signals that may have the following form: Upickup(t)=A*(1+a*sin(m*phi))*sin(2*pi*f0*t). The modulation factor a may derive from the geometry of the arrangement, while phi is the rotation angle between the pickup coils 111, 112 and the conductive targets 121, 122, when both have a period of 360°/m.

In an assembled state of the inductive angle sensor 100, the exciter coil 113, the first and second pickup coil arrangements 111, 112 and the first and second conductive targets 121, 122 may be arranged coaxially with the rotational axis 130. Additionally or alternatively, the exciter coil 113, the first and second pickup coil arrangements 111, 112 and the first and second conductive targets 121, 122 may be arranged along the rotational axis 130 one above the other such that they overlap each other when viewed along the rotational axis 130, e.g. when viewed from the top or from the bottom.

The first pickup coil arrangement 111 and the first conductive target 121 may comprise a same diameter. The second pickup coil arrangement 112 and the second conductive target 122 may comprise a same diameter. Additionally, or alternatively, all of the first and second pickup coil arrangements 111, 112 as well as the first and second conductive targets 121, 122 may comprise the same diameter. The exciter coil 113 may comprise a diameter that is slightly larger than the diameter of at least one of the first and second pickup coil arrangements 111, 112 and the first and second conductive targets 121, 122. The diameter of the conductive targets 121, 122 may be larger than the diameter of the pickup coils 111, 112. Thus, even if the rotor 120 would be arranged eccentrically relative to the stator 110, then the exciter coil 113 may still cover the conductive targets 121, 122 in a projection along the rotation axis (e.g. when viewed from a top or bottom plan view). In other words, the conductive targets 121, 122 may not protrude over the circumference of the exciter coil 113. Additionally, or alternatively, the pickup coils 111, 112 may not protrude over the circumference of the conductive targets 121, 122. Therefore, the inductive angle sensor 100 may be robust with respect to tolerances during assembly.

Figure 2:
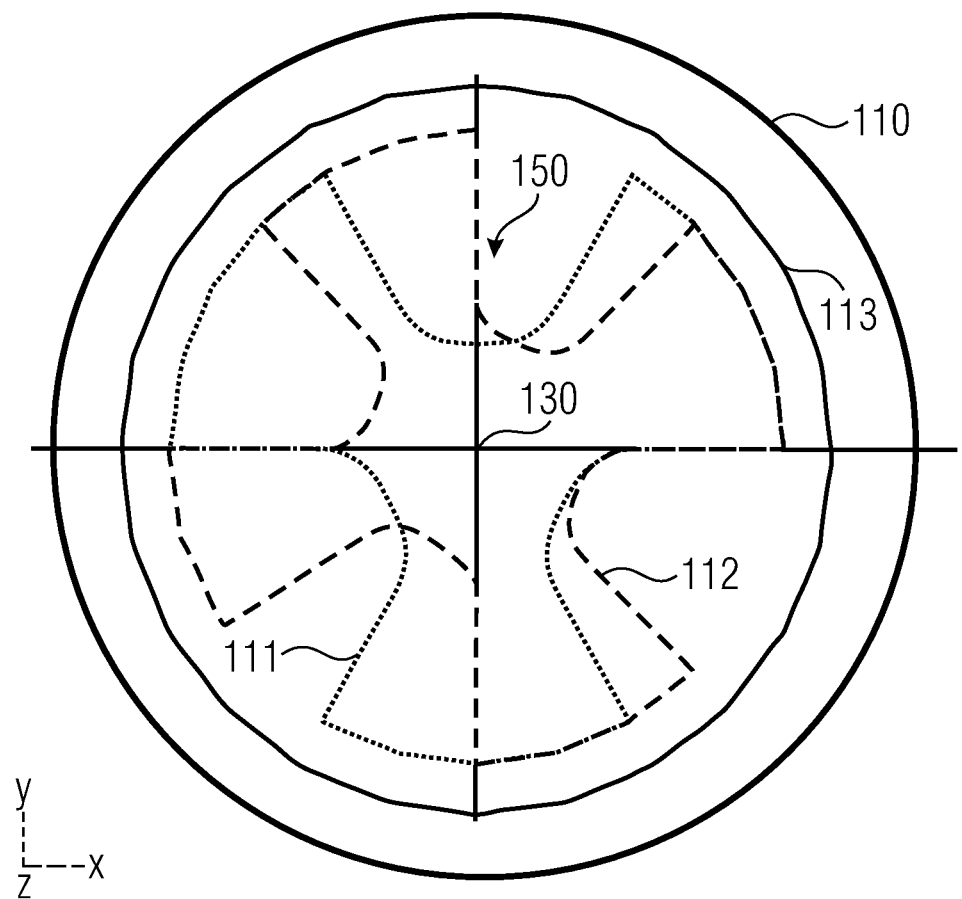
FIG. 2 shows a top view onto a stator comprising an exciter coil, a first pickup coil arrangement and a second pickup coil arrangement.

FIG. 2 shows a top view of the stator 110 which clearly shows the arrangement and symmetries of the first and second pickup coil arrangements 111, 112. As can be seen, the stator 110 may comprise the exciter coil 113 (red), the first pickup coil arrangement 111 (dark blue) and the second pickup coil arrangement 112 (cyan). The exciter coil 113 may be arranged circumferentially around the first and second pickup coil arrangements 111, 112. The first pickup coil arrangement 111 may comprise an m-fold symmetry (here: e.g. a 3-fold symmetry), and the second pickup coil arrangement 112 may comprise an n-fold symmetry (here: e.g. a 4-fold symmetry).

Figure 3A:
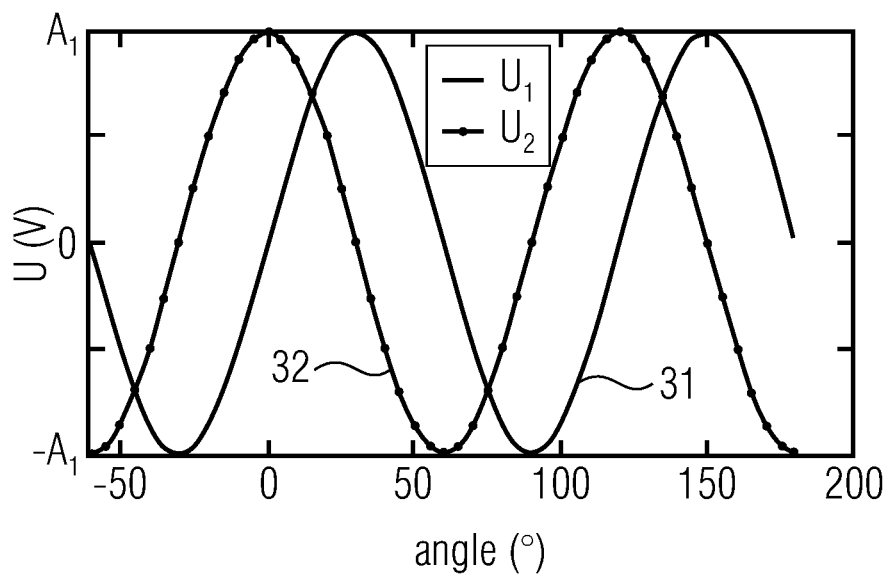
FIG. 3A shows a schematic diagram for determining a phase angle of an induced signal.
Figure 3B:
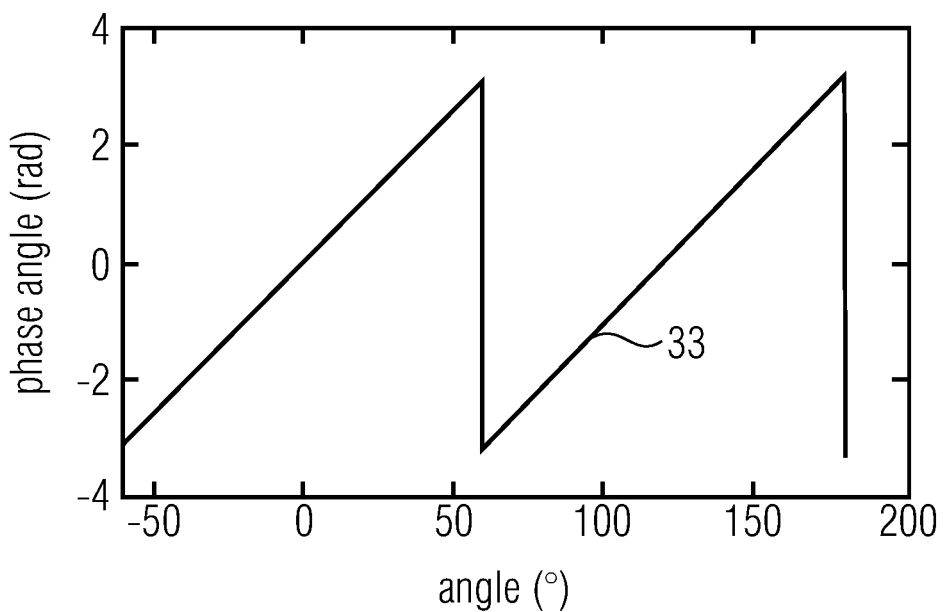
FIG. 3B shows a schematic diagram of a rotational angle being computed from the phase angle of FIG. 3A.

For further explanations of some of the advantages of the innovative inductive angle sensor 100, it shall initially be referred to FIGS. 3A and 3B. They show a comparative example of an inductive angle sensor which uses only one pickup coil arrangement having a 3-fold symmetry.

FIG. 3A shows a diagram of induced voltages $U_1$, $U_2$ in a pickup coil arrangement, wherein the induced voltages $U_1$, $U_2$ are coherently demodulated from their carrier frequency $f_0$, as described above with reference to the arrangement of FIG. 1. This pickup coil arrangement comprises a first coil for measuring the amplitude (abscissa) and phase angle (ordinate) of the induced cosine voltage signal 31 ($U_1$) and a second coil for measuring the amplitude (abscissa) and phase angle (ordinate) of the sine voltage signal 32 ($U_2$). The first and second pickup coils are identical pickup coils of m-fold symmetry, wherein one of the pickup coils is rotated against the other one by 360°/m/4. Therefore, the demodulated signals 31, 32 versus rotation angle are 90° phase shifted in FIG. 3A.

The amplitude of the demodulated signals 31, 32 is exemplarily depicted as ranging between $A_1$ and $-A_1$. The pickup coils which created these signals 31, 32 are non-astatic, which will be described in more detail further below. Thus, the maxima at $A_1$ and the minima at $-A_1$ may not be located symmetrically to A=0, i.e. the signals may not be centered at 0 (not mean value free). In case of rotational movements, the variations of the voltages in the pickup coils may be rather small compared to a rather large superimposed offset or mean value, respectively.

FIG. 3B shows a saw tooth signal 33 which represents the angle of the pointer $\{U_2, U_1\}$ with the $\{1,0\}$ axis. Accordingly, $$\tan(\text{saw tooth}) = \frac{U_1}{U_2}$$

or saw tooth=arctan $2(U_2, U_1)$. The estimated angle of the pointer $\{U_2, U_1\}$ is shown on the ordinate, while the abscissa shows a mechanical angle of the rotation between the rotor 120 and the stator 110 which mechanical angle may be calculated from the angle of the pointer $\{U_2, U_1\}$.

As can be seen in FIGS. 3A and 3B, the signals 31, 32, 33 may be unambiguous over an angular range of 120°, which results from the 3-fold symmetry (360°/3). However, after each repeating angular range of 120° the signal shape repeats, i.e. the signals 31, 32, 33 become ambiguous. One can say, the signals 31, 32, 33 have a periodicity of 360°/k, where k denotes the k-fold symmetry, i.e. in this exemplary case with k=3, such that the signals 31, 32, 33 have a periodicity of 120°. As mentioned above, the signals 31, 32, 33 may be unambiguous during one period but may be ambiguous over two or more periods.

Figure 4:
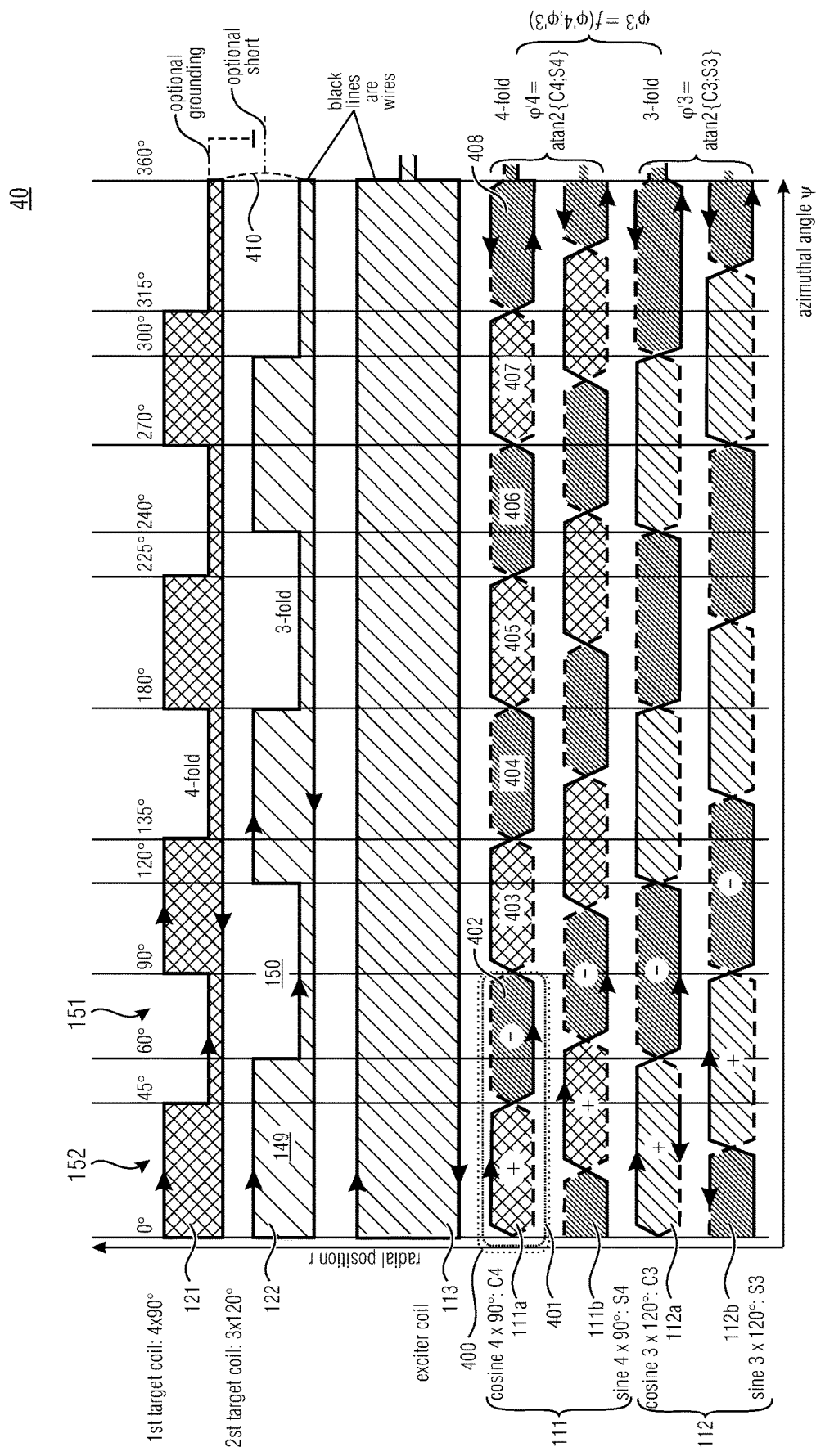
FIG. 4 shows a schematic diagram of coils used in an inductive angle sensor according to an embodiment.

FIG. 4 shows a schematic diagram 40 for explaining some possible geometrical arrangements of coils which may be used in an inductive angular sensor 100 according to the herein described innovative principle. This diagram 40 does not show signal forms, it represents an exemplary geometrical arrangement of the exciter coil 113, the first and second pickup coil arrangements 111, 112 and the first and second conductive targets 121, 122. In order to clearly show the correlations between the geometrical shape and the angle dependencies of the depicted coils and targets 111, 112, 113, 121, 122, diagram 40 shows these coils and targets 111, 112, 113, 121, 122 schematically as having a straight linear shape, while actually they may comprise an annular (e.g. circular) shape as described above with reference to FIGS. 1 and 2.

In other words, the schematic diagram of FIG. 4 is a simplified view of coil geometries where the azimuthal coordinate is plotted on the abscissa axis and the radial coordinate is plotted on the ordinate axis. Thus, as shown in FIGS. 1 and 2, the coils may actually be ring shaped and their respective ends may touch at 0° and 360°.

From top to bottom, FIG. 4 shows the first conductive target 121, the second conductive target 122, the exciter coil 113, the first pickup coil arrangement 111 and the second pickup coil arrangement 112.

The first conductive target 121 may comprise an m-fold symmetry. In this exemplary case, it may comprise a 4-fold symmetry. As can be seen, it may comprise a geometrical pattern which repeats every 360°/m, in this exemplary case every 90°. For example, as shown, the first conductive target 121 may comprise a tooth 152 spanning over first 45° and an indentation 151 spanning over the directly subsequent 45°. This pattern of alternating indentations and teeth 151, 152 may repeat every 360°/m, in this exemplary case every 90°.

The second conductive target 122 may comprise an n-fold symmetry. In this exemplary case, it may comprise a 3-fold symmetry. As can be seen, it may comprise a geometrical pattern which repeats every 360°/n, in this exemplary case every 120°. For example, as shown, the second conductive target 122 may comprise a tooth 149 spanning over first 60° and an indentation 150 spanning over the directly subsequent 60°. This pattern of alternating teeth and indentations 149, 150 may repeat every 360°/n, in this exemplary case every 120°.

The above discussed teeth and indentations are only described as non-limiting examples. The first and second conductive targets 121, 122 may comprise other forms and geometrical shapes, as long as they comprise an m-fold and n-fold symmetry.

The exciter coil 130 may comprise a straight shape without any particular patterns. For example, the exciter coil 130 may comprise a wire that is laid in one single loop and at shortest distance, i.e. annularly and in a straight line. As mentioned above, the wires which are shown in FIG. 4 are only linear for illustrative purposes. In reality, they may be arranged in the shape of a circle. Accordingly, the two wires of the depicted exciter coil 130 may form a first circle with a first diameter (outer circle) and a second circle with a smaller second diameter (inner circle). As indicated with the arrow heads in FIG. 4, the current in the inner and outer circles flows in opposite directions.

The first pickup coil arrangement 111 may comprise two single pickup coils, e.g. a first pickup coil 111a and a second pickup coil 111b. Each of the first and second pickup coils 111a, 111b may have an m-fold symmetry. In this example, m=4, i.e. they have a 4-fold symmetry. As can be seen, the first and second pickup coils 111a, 111b may be shifted relatively to each other by 90°/m, i.e. in this exemplary case by 22.5°. As mentioned before, the first and second pickup coils 111a, 111b may actually be circularly arranged as shown in FIGS. 1 and 2. Accordingly, if applied to the circular shape, the first and second pickup coils 111a, 111b may be rotated relatively to each other around the rotational axis 130 by 90°/m, e.g. by 22.5°. For example, the first pickup coil 111a may be a cosine pickup coil for picking up a cosine signal, while the second pickup coil 111b may be a sine pickup coil for picking up a sine signal.

The second pickup coil arrangement 112 may comprise two single pickup coils, e.g. a third pickup coil 112a and a fourth pickup coil 112b. Each of the third and fourth pickup coils 112a, 112b may have an n-fold symmetry. In this example, n=3, i.e. they have a 3-fold symmetry. As can be seen, the third and fourth pickup coils 112a, 112b may be shifted relatively to each other by 90°/n, i.e. in this exemplary case by 30°. As mentioned before, the third and fourth pickup coils 112a, 112b may actually be circularly arranged as shown in FIGS. 1 and 2. Accordingly, if applied to the circular shape, the third and fourth pickup coils 112a, 112b may be rotated relatively to each other around the rotational axis 130 by 90°/n, e.g. by 30°. For example, the third pickup coil 112a may be a cosine pickup coil for picking up a cosine signal, while the fourth pickup coil 112b may be a sine pickup coil for picking up a sine signal.

It may also be possible that at least one of the first and second pickup coil arrangements 111, 112 may comprise more than the exemplarily described two pickup coils 111a, 111b, 112a, 112b. For example, at least one of the first and second pickup coil arrangements 111, 112 may comprise three pickup coils (u, v, w), e.g. in case a three phase signal (e.g. a three-phase current) is to be measured. Then two of these three pickup coils would preferably have to be rotated against each other by 120°/n around the rotational axis.

As can be seen, each of the first and second pickup coils 111a, 111b of the first pickup coil arrangement 111 may be arranged in loops 401 to 408. For instance, the first pickup coil 111a may comprise a number of 2*m loops 401 to 408 along a full revolution of 360° in a ring domain. In this exemplary case the first pickup coil 111a may comprise 2*4=8 loops 401 to 408 over the full 360°. Additionally, or alternatively, the second pickup coil 111b may comprise a number of 2*m loops arranged along a full revolution of 360° in a ring domain. In this exemplary case the second pickup coil 111b may comprise 2*4=8 loops over the full 360°.

Additionally, or alternatively, each of the third and fourth pickup coils 112a, 112b of the second pickup coil arrangement 112 may be arranged in loops. For instance, the third pickup coil 112a may comprise a number of 2*n loops along a full revolution of 360° in a ring domain. In this exemplary case the third pickup coil 112a may comprise 2*3=6 loops over the full 360°. Additionally, or alternatively, the fourth pickup coil 112b may comprise a number of 2*n loops arranged along a full revolution of 360° in a ring domain. In this exemplary case the fourth pickup coil 112b may comprise 2*3=6 loops over the full 360°.

Returning to the example of the first pickup coil 111a of the first pickup coil arrangement 111, the first loop 401 and the second loop 402 may have an opposite winding direction, wherein the first loop 401 may be a positive winding and the second loop 402 may be a negative winding. The winding direction may also be referred to as a revolution direction and describes the direction of the revolutions of the one or more windings of a coil.

The single loops 401 to 408 may be grouped into groups or sets of loops. For example, a first set of loops may contain those loops 401, 403, 405, 407 having a positive revolution direction, while a second set of loops may contain those loops 402, 404, 406, 408 having a negative revolution direction. Accordingly, each of the first and second pickup coils 111a, 111b may comprise a first set of loops in which each loop 401, 403, 405, 407 comprises a first revolution direction and a second set of loops in which each loop 402, 404, 406, 408 comprises an opposite second revolution direction. As exemplarily shown, loops having the first revolution direction may be alternatingly arranged with loops having the second revolution direction, i.e. adjacent loops may have an opposite revolution direction.

Each loop 401 to 408 spans an area, which is the respective surface area or volume inside the respective loop 401 to 408. Accordingly, all of the loops 401, 403, 405, 407 contained in the first set of loops may together span a first area, while all of the loops 402, 404, 406, 408 contained in the second set of loops may together span a second area.

According to an exemplary embodiment, the first and second areas of the first pickup coil 111a may be identical such that the first pickup coil 111a is astatic. Additionally, or alternatively, the first and second areas of the second pickup coil 111b may be identical such that the second pickup coil 111b is astatic. The term 'identical' may include a deviation of the sizes of the first and second areas by up to 10% or up to 20%, e.g. due to tolerances.

The same may hold for the second pickup coil arrangement 112 comprising the third and fourth pickup coils 112a, 112b. Each loop may span an area, which is the respective surface area or volume inside the respective loop. In this exemplary embodiment, all of the loops contained in a first set of loops with a first revolution direction may together span a first area, while all of the loops contained in a second set of loops with an opposite second revolution direction may together span a second area. According to an exemplary embodiment, the first and second areas of the third pickup coil 112a may be identical such that the third pickup coil 112a is astatic. Additionally, or alternatively, the first and second areas of the fourth pickup coil 112b may be identical such that the fourth pickup coil 112b is astatic.

In the example shown in FIG. 4, each of the loops 401 to 408 is shown as spanning an area with same size. However, the single loops 401 to 408 may span areas of different sizes. As long as the total size of all spanned areas of all loops contained in the first set of loops is equal to the total size of all spanned areas of all loops contained in the second set of loops, the respective pickup coil 111a, 111b, 112a, 112b is astatic.

Accordingly, at least one of the first and second pickup coils 111a, 111b and/or at least one of the third and fourth pickup coils 112a, 112b is a so-called astatic or differential pickup coil. This means that any homogeneous magnetic field impinging on an astatic pickup coil 111a, 111b, 112a, 112b gives zero net flux through it. If this field is time varying it induces no voltage in the respective astatic pickup coil 111a, 111b, 112a, 112b. Moreover, the mutual inductance between both astatic pickup coils 111a, 111b, 112a, 112b of one particular pickup coil arrangement 111, 112 vanishes. Also, the mutual inductance between any astatic pickup coil 111a, 111b of the first pickup coil arrangement 111 and any other astatic pickup coil 112a, 112b of the second pickup coil arrangement 112 vanishes. Also, the mutual inductance between any astatic pickup coil 111a, 111b, 112a, 112b and the exciter coil 113 vanishes. This is different from conventional inductive angle sensors having non-astatic pickup coils, where any time a varying magnetic field impinges on a pickup coil it generates eddy currents in the respective pickup coil resulting in an inductive coupling (i.e. a mutual inductance) between two nearby coils.

The first and second conductive targets 121, 122 may, in turn, be non-astatic. As explained above, they may comprise an alternating pattern comprising teeth and indentations 149 to 152. A tooth 149, 152 may correspond to a first loop and an indentation 150, 151 may correspond to a second loop. As can be seen, all loops (i.e. teeth and indentations) of the first conductive target 121 may comprise the same direction of revolutions. The same holds for all loops of the second conductive target 122. Thus, the first and second conductive targets 121, 122 are non-astatic, which is irrespective of the size of the loops (i.e. teeth and indentations). Since the first and second conductive targets 121, 122 are non-astatic, the exciter coil 113 may induce an induction current in the targets 121, 122.

One of several advantages of the herein described innovative conductive angle sensor 100 is that the first conductive target 121 with m-fold symmetry (e.g. 4×90°) may induce signals only in the first and second pickup coils 111a, 111b (e.g. cosine and sine) since they comprise the same m-fold symmetry as the first conductive target 121. However, the first conductive target 121 with m-fold symmetry may not induce any relevant signals in the third and fourth pickup coils 112a, 112b (e.g. cosine and sine) since they comprise an n-fold symmetry with n≠m. Also, the second conductive target 122 with n-fold symmetry (e.g. 3×120°) may induce signals only in the third and fourth pickup coils 112a, 112b (e.g. cosine and sine) since they comprise the same n-fold symmetry as the second conductive target 122. However, the second conductive target 122 may not induce any relevant signals in the first and second pickup coils 111a, 111b (e.g. cosine and sine) since they comprise an m-fold symmetry with m n.

The reason for this is the selectivity of the pickup coils 111a, 111b, 112a, 112b, which follows from the property of orthogonality of sine-functions: a coil of n-fold symmetry integrates over flux from 0° to 360° thereby cancelling out all flux patterns of symmetry being different than n-fold. This shall now be proven with the following mathematical equations describing the theoretical background of the innovative inductive angle sensor 100:

(note that the following example uses n-fold and k-fold symmetries, wherein the k-fold symmetry may correspond to the m-fold symmetry described otherwise herein)

Suppose a conductive target 122 with n-fold symmetry. If eddy currents are flowing in this target 122 they will generate a magnetic flux density with n-fold symmetry:

$$B_z^{(n)} = \sum_{m=1}^{\infty} b_m^{(n)}(r)\sin(mn\psi + \varphi)\sin(\omega_o t)$$

wherein $\omega_o/(2\pi)$ is the carrier frequency, $\psi$ is the azimuthal coordinate, r is the radial coordinate, and $\varphi$ is the rotation angle of the target 122. Furthermore, $b_m^{(n)}(r)$ is the radial dependence of the m-th harmonic of the flux density. What is the voltage induced in a pickup coil 111a, 111b with k-fold symmetry? We assume that the pickup coils 111a, 111b have 2*k loops 401 to 408 arranged along a full revolution of 360° in a ring domain, whereby every second loop has an opposite winding direction. This corresponds to the pickup coils 111a, 111b sketched in FIG. 4. Since the conductive target 122 was assumed to be shifted by $\varphi$ against $\psi=0°$ we can assume the target coils 111a, 111b to be aligned with $\psi=0°$. Thus, the first two loops 401, 402 may collect the following flux $$\phi_1(\psi_0) = \int_{r=r_i}^{r_o} \int_{\psi=\psi_0}^{2\pi/(2k)+\psi_0} \sum_{m=1}^{\infty} b_m^{(n)}(r)\sin(mn\psi + \varphi)\sin(\omega_o t)rdrd\psi -$$

-continued $$\int_{r=r_i}^{r_o} \int_{\psi=2\pi/(2k)+\psi_0}^{4\pi/(2k)+\psi_0} \sum_{m=1}^{\infty} b_m^{(n)}(r)\sin(mn\psi + \varphi)\sin(\omega_o t)rdrd\psi == \sin(\omega_o t)$$

$$\sum_{m=1}^{\infty} \int_{r=r_i}^{r_o} b_m^{(n)}(r)rdr\left[\int_{\psi=\psi_0}^{\pi/k+\psi_0} \sin(mn\psi + \varphi)d\psi - \int_{\psi=\pi/k+\psi_0}^{2\pi/k+\psi_0} \sin(mn\psi + \varphi)d\psi\right] =$$

$$\sin(\omega_o t)\sum_{m=1}^{\infty} \frac{-4}{mn}\cos\left(\varphi + mn\frac{\pi + k\psi_0}{k}\right)\sin^2\frac{mn\pi}{2k}\int_{r=r_i}^{r_o} b_m^{(n)}(r)rdr$$

This may vanish for even m—only odd m remain (then the sine term is equal to 1). Summing up over all k loops 401 to 408 gives the total flux $$\phi = \sum_{\ell=0}^{k-1} \phi_1\left(\psi_0 = \frac{2\pi\ell}{k}\right) =$$

$$\frac{-4}{n}\sin(\omega_o t)\sum_{m=1}^{\infty} \frac{1}{2m+1} \int_{r=r_i}^{r_o} b_{2m+1}^{(n)}(r)rdr \sum_{\ell=0}^{k-1} \cos\left(\varphi + \pi\frac{n}{k}(2m+1)(2\ell+1)\right)$$

It holds $\sum_{\ell=0}^{k-1} \exp\left(i\pi\frac{n}{k}(2m+1)(2\ell+1)\right) = \begin{cases} 0 \text{ for } n \neq k \\ -n \text{ for } n = k \end{cases}$ with $i = \sqrt{-1}$. Thus $\phi = 4\cos(\varphi)\sin(\omega_o t)\sum_{m=1}^{\infty} \frac{1}{2m+1} \int_{r=r_i}^{r_o} b_{2m+1}^{(n)}(r)rdr$ for n = k (otherwise = 0).

Strictly speaking the proof implies that the pickup coils 111a, 111b subtend the entire ring area—if they cover less due to losses near the crossings of neighboring loops we have to compute $$\phi_1(\psi_0) = \int_{r=r_i}^{r_o} \int_{\psi=\psi_0+\Delta}^{2\pi/(2k)+\psi_0-\Delta} \sum_{m=1}^{\infty} b_m^{(n)}(r)\sin(mn\psi + \varphi)\sin(\omega_o t)rdrd\psi -$$

$$\int_{r=r_i}^{r_o} \int_{\psi=2\pi/(2k)+\psi_0+\Delta}^{4\pi/(2k)+\psi_0-\Delta} \sum_{m=1}^{\infty} b_m^{(n)}(r)\sin(mn\psi + \varphi)\sin(\omega_o t)rdrd\psi ==$$

$$\sin(\omega_o t)\sum_{m=1}^{\infty} \frac{4}{mn}\cos\left(\varphi + mn\frac{\pi + k\psi_0}{k}\right)\sin\frac{mn\pi}{2k}\sin\left(mn\Delta - \frac{mn\pi}{2k}\right)\int_{r=r_i}^{r_o} b_m^{(n)}(r)rdr$$

Then the total flux again vanishes for k≠n. If k=n it vanishes for even m. For odd m one gets finally $$\phi = 4\cos(\varphi)\sin(\omega_o t)\sum_{m=1}^{\infty} \frac{\cos((2m+1)\Delta)}{2m+1} \int_{r=r_i}^{r_o} b_{2m+1}^{(n)}(r)rdr$$

for n=k (otherwise=0).

In the most general case, the pickup coils may comprise a k-fold symmetry with $$r_i = \text{Re} \sum_{p=0}^{\infty} \rho_{i,p} \exp(ikp\,\psi)$$

and $$r_o = \text{Re} \sum_{p=0}^{\infty} \rho_{o,p} \exp(ikp\,\psi)$$

where Re means the real part and the coefficients $\rho_{i,p}, \rho_{o,p}$ are complex valued. Then we can write $$\int_{r=r_i(\psi)}^{r_o(\psi)} b_m^{(n)}(r) r\, dr = \text{Re} \sum_{p=0}^{\infty} \beta_{m,p}^{(n)} \exp(ikp\,\psi)$$

The flux through the first two loops is $$\phi_1(\psi_0) = \sin(\omega_o t) \text{Re} \sum_{m=1}^{\infty} \sum_{p=0}^{\infty} \beta_{m,p}^{(n)} \left[ \int_{\psi=\psi_0}^{2\pi/(2k)+\psi_0} \exp(ikp\,\psi) \sin(mn\,\psi+\varphi) d\psi - \right.$$

$$\left. \int_{\psi=2\pi/(2k)+\psi_0}^{4\pi/(2k)+\psi_0} \exp(ikp\,\psi) \sin(mn\,\psi+\varphi) d\psi \right] = \sin(\omega_o t) \text{Re}$$

$$\sum_{m=1}^{\infty} \sum_{p=0}^{\infty} \frac{-i}{2} \beta_{m,p}^{(n)} \left[ \int_{\psi=\psi_0}^{2\pi/(2k)+\psi_0} \exp(ikp\,\psi) [\exp(imn\,\psi+i\varphi) - \exp(-imn\,\psi-i\varphi)] \right.$$

$$\left. d\psi - \int_{\psi=2\pi/(2k)+\psi_0}^{4\pi/(2k)+\psi_0} \exp(ikp\,\psi)[\exp(imn\,\psi+i\varphi) - \exp(-imn\,\psi-i\varphi)] d\psi \right] =$$

$$\sin(\omega_o t) \text{Re} \sum_{m=1}^{\infty} \sum_{p=0}^{\infty} \frac{-i}{2} \beta_{m,p}^{(n)} \left[ \exp(i\varphi) \int_{\psi=\psi_0}^{\pi/k+\psi_0} \exp(i(kp+mn)\psi) d\psi - \right.$$

$$\exp(-i\varphi) \int_{\psi=\psi_0}^{\pi/k+\psi_0} \exp(i(kp-mn)\psi) d\psi - \exp(i\varphi) \int_{\psi=\pi/k+\psi_0}^{2\pi/k+\psi_0} \exp(i(kp+mn)\psi) d\psi +$$

$$\left. \exp(-i\varphi) \int_{\psi=\pi/k+\psi_0}^{2\pi/k+\psi_0} \exp(i(kp-mn)\psi) d\psi \right]$$

If we sum up all terms multiplied by $\exp(i\varphi)$ for $$\sum_{\lambda=0}^{k-1} \Phi_1\left(\psi_0 = \frac{2\pi\lambda}{k}\right),$$

we get zero for $k \neq n$. If we sum up all terms multiplied by $\exp(-i\varphi)$ for $$\sum_{\lambda=0}^{k-1} \Phi_1\left(\psi_0 = \frac{2\pi\lambda}{k}\right),$$

we also get zero for $k \neq n$.

However, if $k=n$ all terms with $m=p$ vanish and we get $$\phi = \sin(\omega_o t) \text{Re} \sum_{\substack{m=1 \\ m \neq p}}^{\infty} \sum_{p=0}^{\infty} \beta_{m,p}^{(n)} (1-(-1)^{m+p}) \left[ \frac{\exp(i\varphi)}{m+p} + \frac{\exp(-i\varphi)}{m-p} \right]$$

for $k=n$, otherwise=0.

This proves that a conductive target 122 with n-fold symmetry does not induce currents in a pickup coil 111a, 111b, which has k-fold symmetry with $k \neq n$. (As mentioned before, in the above mathematical example, k corresponds to m as otherwise described herein.)

This proof is important, because it means that we can split up the signals induced by two targets 121, 122 if they have n-fold and m-fold symmetry by using two pickup coil arrangements 111, 112 with corresponding n-fold and m-fold symmetry, respectively. The pickup coil arrangement 111 with m-fold symmetry responds only to the conductive target 121 with corresponding m-fold symmetry—the induced signal $S_{i1}$ in this pickup coil arrangement 111 may, however, not respond to the conductive target 122 with n-fold symmetry. And vice versa. Therefore, we have no crosstalk between the m-fold symmetry parts 111, 121 and the n-fold symmetry parts 112, 122.

Therefore we do not have to place the two conductive targets 121, 122 and the two pickup coil arrangements 111, 112 far apart (if a target and a pickup coil arrangement with m-fold symmetry were far apart from a target and a pickup coil arrangement with n-fold symmetry, it is clear that the two do not interfere—there is no crosstalk). We also do not have to shield the pickup coil arrangement 111 with m-fold symmetry from the magnetic field of the eddy currents in the conductive target 122 of n-fold symmetry.

Therefore, we can use a single exciter coil 113 for both conductive targets 121, 122 (since they are close together). This saves power and costs and construction space.

An advantage of the above discussed concept is that the induced signals $S_{i1}$ and $S_{i2}$ can be clearly separated from each other, i.e. the signal-to-noise ratio (SNR) is improved, which shall be explained with reference to FIG. 5.

Figure 5:
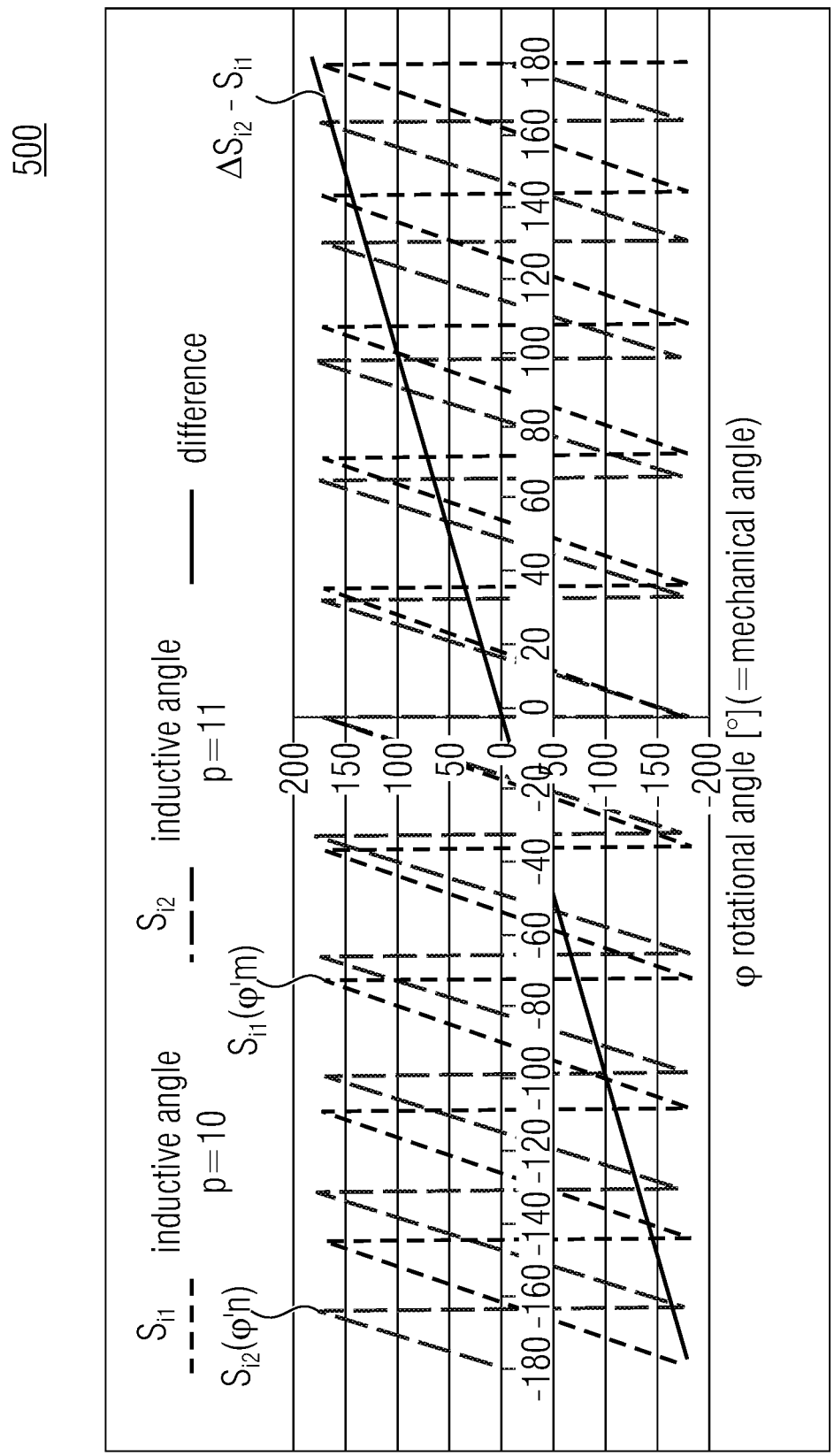
FIG. 5 shows a schematic diagram of computing a rotational angle based on a difference of first and second induced signals.

FIG. 5 depicts a diagram 500 showing induced signals $S_{i1}$, $S_{i2}$ which may be generated by an inductive angle sensor 100 according to the herein described principle. The inductive angle sensor 100 of this example may comprise a first conductive target 121 and a first pickup coil arrangement 111 both having an m-fold symmetry, wherein m=10, and a second conductive target 122 and a second pickup coil arrangement 112 both having an n-fold symmetry, wherein n=11.

Based on the depicted two induced signals $S_{i1}$, $S_{i2}$ a rotational angle φ of the rotor 120 relative to the stator 110 may be computed. In particular, the rotational angle φ may be computed as a function of two angles φ'm, φ'n each being derivable from a respective one of the induced signals $S_{i1}$, $S_{i2}$. More particularly, the first induced signal $S_{i1}$ may be sampled, the sampled values may then be interpreted as coordinates of a pointer and the angle of the pointer relative to the positive horizontal axis may then be calculated based thereon. The same may be done with the second induced signal $S_2$. In result, the depicted angles φ'm, φ'n may be obtained, which angles φ'm, φ'n are also referred to in FIG. 5 as inductive angles. The mechanical rotational angle φ of the rotor 120 relative to the stator 110 may be computed as a function of the two inductive angles φ'm, φ'n, e.g. according to φ=f(φ'm, φ'n).

For example, a difference $\Delta\varphi'n\,\varphi'm$ of the inductive angles $\varphi'm$, $\varphi'n$ of the two induced signals $S_{i1}$, $S_{i2}$ may represent the rotational angle $\varphi$ of the rotor 120 relative to the stator 110, e.g. according to $\varphi=\varphi'n-\varphi'm$. As can be seen in FIG. 5, the mechanical rotational angle $\varphi$ being calculated according to the herein described principle is unambiguous over a full revolution of 360°. Conventional angle sensors, as previously described above with reference to FIGS. 3A and 3B, may instead lead to ambiguous readings of the signals.

(Note that the above discussed inductive angles $\varphi'm$ and $\varphi'n$ are also shown in FIG. 4 with m=4 and n=3.)

Due to the fact that the inductive angle sensor 100 according to the herein described principle comprises targets and pickup coil arrangements 111, 121 with an m-fold symmetry as well as targets and pickup coil arrangements 112, 122 with an n-fold symmetry, with n m, the respective induced signals $S_{i1}$, $S_{i2}$ may comprise different inductive angles $\varphi'm$, $\varphi'n$ as shown in FIG. 5. The difference $\Delta\varphi'n\,\varphi'm$ of the inductive angles $\varphi'm$, $\varphi'n$ of the induced signals $S_{i1}$, $S_{i2}$ may provide for an unambiguous reading of the rotational angle $\varphi$ of the rotor 120 over a full revolution of 360°.

For example, similar as described above with reference to the saw tooth signal of FIG. 3B, the first induced signal $Si_1$, from which the first inductive angle $\varphi'm$ may be derived, may be computed from the signals (e.g. cosine and sine) picked up by the first and second pickup coils 111a, 111b of the first pickup coil arrangement 111 having the m-fold symmetry, while the second induced signal $S_{i2}$, from which the second inductive angle $\varphi'n$ may be derived, may be computed from the signals (e.g. cosine and sine) picked up by the third and fourth pickup coils 112a, 112b of the second pickup coil arrangement 112 having the n-fold symmetry. Based thereon, a global rotational angle $\varphi$ representing the aforementioned rotational angle $\varphi$ of the rotor 120 may be computed from the difference $\Delta\varphi'm\,\varphi'n$ of the local inductive angles $\varphi'm$, $\varphi'n$.

For example, the global rotation angle $\varphi$ may be calculated as the difference of both local inductive angles $\varphi'm$, $\varphi'n$ according to:

$$\varphi=\varphi'n-\varphi'm \bmod 360$$

For example, said difference may be computed like this:

$$\text{Difference}=\arctan_2\{\cos(\varphi'n)*\cos(\varphi'm)+\sin(\varphi'n)*\sin(\varphi'm);\ \sin(\varphi'n)*\cos(\varphi'm)-\cos(\varphi'n)*\sin(\varphi'm)\}$$

Here $\arctan_2$ is the arctangent function, which account of the quadrant, where the angle is (as defined in EXCEL).

This unambiguous reading may also be referred to as a so-called Vernier principle. According to such an embodiment, the signal analysis device 140 may be configured to determine a first angle $\varphi'm$ based on the first induced signal $S_{i1}$ from the first conductive target 121, and to determine a second angle $\varphi'n$ based on the second induced signal $S_{i2}$ from the second conductive target 122. The signal analysis device 140 may further be configured to determine an unambiguous mechanical rotational angle $\varphi$ of the rotor 120 relative to the stator 110 according to a Vernier principle as a function of the first and second angles $\varphi'm$, $\varphi'n$ according to $\varphi=f(\varphi'm, \varphi'n)$.

Note that the above described Vernier principle may be provided by the inductive angle sensor 100 irrespective of whether it comprises astatic or non-astatic pickup coil arrangements 111, 112. For example, the inductive angle sensor 100 of the herein described principle may comprise astatic pickup coil arrangements 111, 112 as described above. Alternatively, the inductive angle sensor 100 may comprise non-astatic pickup coil arrangements. Further alternatively, the inductive angle sensor 100 may comprise at least one astatic pickup coil arrangement and at least one non-astatic pickup coil arrangement. However, as mentioned above, using astatic pickup coil arrangements may provide for a higher SNR and smaller pick-up of external disturbances.

Summarizing and referring back to the exemplary embodiment of FIG. 4, an inductive angle sensor 100 may be provided comprising a target arrangement 123 comprising two targets 121, 122 with different periods of 360°/n and 360°/m (with e.g. m=n+1 and n>1, integer). The target arrangement 123 may be excited with a single exciter coil 113. Corresponding sine and cosine signals may be detected with periodicity 360°/n and with periodicity 360°/m, and angles thereof $\varphi'n$, $\varphi'm$ (phi_n and phi_m) may be computed, deriving a global angle $\varphi$.

In the following, some practical implementations may be given for providing some non-limiting practical examples of the inductive angle sensor 100 according to the herein described innovative principle:

Generally, there may be two types of arrangements, wherein (i) one can stack both targets 121, 122 in axial direction (the rotation axis extends in axial direction), or (ii) on can place one target 121 within a circle centered on the rotation axis 130 and the other target 122 outside a circle centered on the rotation axis 130 (inner versus outer target coil). Preferably, the corresponding pickup coils 111, 112 should be arranged likewise (because for certain rotational positions the overlap between pickup coils 111, 112 and target 121, 122 should be large).

Type (i) may need less radial space and only negligibly more axial space than type (ii). As we will see in the FEM-simulation results below, type (i) may have approximately 30% signal loss due to inductive coupling of the target coils 121, 122. However, the positive effect is the above mentioned unambiguous reading.

It may be possible to mount all pickup coil arrangements 111, 112 and the exciter coil 113 on a same or common substrate, e.g. on a common PCB. Then they may be arranged very accurately with respect to each other and this placement may also be very stable over operating conditions.

For example, the stator 110 may comprise a PCB with several metal layers, for instance a first metal layer for providing the first pickup coil 111a (e.g. m-fold cosine), and/or a second metal layer for providing the second pickup coil 111b (e.g. m-fold sine), and/or a third metal layer for providing the third pickup coil 112a (e.g. n-fold cosine), and/or a fourth metal layer for providing the fourth pickup coil 112b (e.g. n-fold sine), and/or a fifth metal layer for providing the exciter coil 113. A respective circuitry may be connected to the targets 121, 122 to generate, by means of the exciter coil 113, the exciting AC magnetic field and to detect, by means of the pickup coils 111a, 111b, 112a, 112b, the induced voltages.

Figure 6:
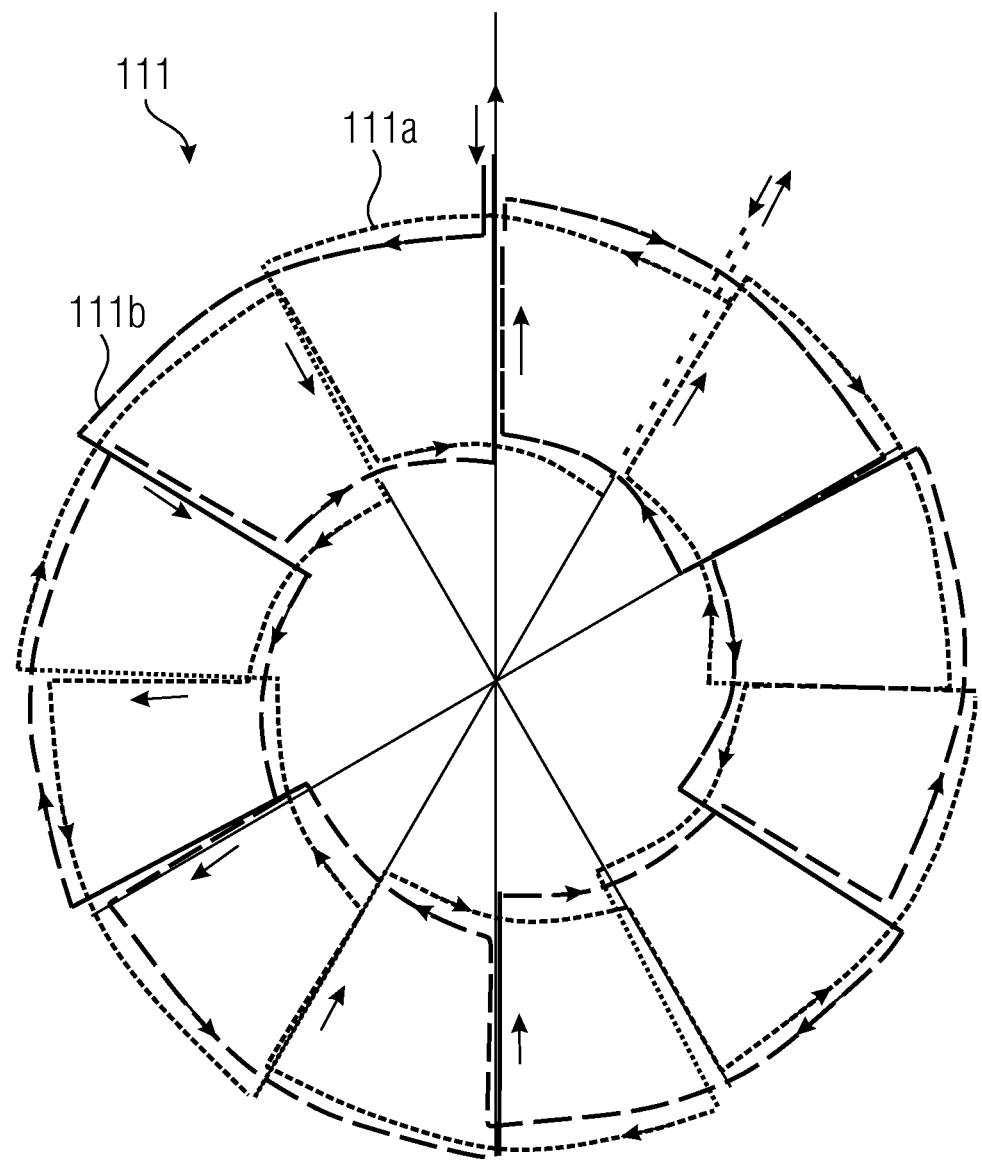
FIG. 6 shows a schematic top view onto an astatic pickup coil arrangement, wherein one pickup coil is arranged on a first side of a substrate and a second pickup coil is arranged on an opposite second side of the substrate.

FIG. 6 shows a possible implementation of an astatic pickup coil arrangement 111 comprising first and second astatic pickup coils 111a, 111b. The astatic pickup coil arrangement 111 comprises an m-fold symmetry. Accordingly, the first and second astatic pickup coils 111a, 111b may also comprise an m-fold symmetry. In this example, the first astatic pickup coil 111a is a cosine pickup coil (dashed lines) and the second astatic pickup coil 111b is a sine pickup coil (solid lines). Both astatic pickup coils 111a, 111b are exemplarily implemented in two metal layers in a 2-layer PCB. The blue color represents the bottom layer and the orange color represents the top layer. If two segments of a different color meet, there may be a via.

Additionally, or alternatively, the two targets 121, 122 may be mounted on a same substrate (e.g. a holder) which may optionally attach them to a rotatable shaft for rotating the rotor 120 around the rotational axis 130. If the two targets 121, 122 may be mounted together to the shaft, they may be accurately aligned against each other.

At least one of the targets 121, 122 may comprise a coil with one or multiple windings. At least one of the targets 121, 122 may be implemented as a conductor trace on at least a portion of a common substrate, e.g. on a top or bottom side or inside of a PCB. It may be possible to use different layers of the PCB for each target 121, 122 (e.g. coils), for example a first layer on top of the PCB and a second layer at the bottom side of the PCB. Additionally, or alternatively, one or more layers inside a PCB-stack may be possible for providing the one or more targets 121, 122 as conductor traces. For example, one may use several layers for each target 121, 122 and combine them in such a way that the targets 121, 122 are highly symmetric but galvanically isolated against each other. In general, the targets 121, 122 may share all layers of the PCB together, e.g. some segments of the first target 121 may be implemented in the same layer as some segments of the second target 122 without shorts between both targets 121, 122.

For example, in the embodiment shown in FIG. 4, the target arrangement 123 may comprise two short circuited conductive targets 121, 122 (e.g. target coils) having n=3 and m=4 regular loops 401 to 408. For example, the conductive targets 121, 122 may be implemented as two coils on a printed circuit board (PCB) which may optionally be fixed to the rotor 120. Then, only a single metal layer per coil 121, 122 could be sufficient.

According to a further embodiment, the first and second targets 121, 122 may be made from sheet metal, where parts may be stamped out or etched off—then the remaining parts of the sheet metal may act as conductors/wires of the targets 121, 122 (e.g. coils) For example, the first conductive target 121 may be made from sheet metal comprising a geometrical shape with an m-fold symmetry, e.g. having teeth and indentations. Additionally, or alternatively, the second conductive target 122 may be made from sheet metal comprising a geometrical shape with an n-fold symmetry.

As mentioned before, it may be advantageous not to isolate both targets 121, 122 from each other, but to short them in one common node 410, which is exemplarily depicted in FIG. 4. In other words, the first conductive target 121 and the second conductive target 122 may be connected to a common electrical potential 410, e.g. to ground. This may avoid floating since the shorted targets 121, 122 may comprise the same DC potential. Or stated differently, this still avoids loop currents flowing through both targets 121, 122, which loop currents may lead to angle errors, but it ties the potential of both targets 121, 122 together. Moreover, this common node 410 may be connected electrically to system ground. For example, if a rotatable shaft for rotating the rotor 120 relative to the stator 110 would be conductive, it may be good to tie the common node 410 electrically to said shaft. The shaft is usually grounded through its bearings. If non-conducting bearings are used it might be necessary to use some brush or spring to make electric contact between the rotatable shaft and ground node in the stator 110.

In an electromagnetic sensor system it is generally risky to let any metal part float, because due to various effects, such as friction, it may load up to very high electric potential which gives large electric fields and this may harm nearby electronic parts, e.g. they may be damaged or the large electric field may give rise to long-term drifts of sensitive electronic circuitry.

If the target 121, 122 is a massive metal plate and a mounting portion for mounting the targets 121, 122 to the shaft is also a metal flange, then electrical contact is automatically accomplished to the metallic rotatable shaft. If the mounting portion is some plastic, it may contain conductive powder (like graphite) to make electrical contact between the targets 121, 122 and the shaft, wherein only low conductivity may be sufficient. If the target 121, 122 is a coil on a PCB, the PCB may be attached via electrically conductive means to the shaft: e.g. the coils 121, 122 may comprise a wire going to the metal screw, which fixes the PCB at the shaft.

As a further exemplary embodiment, the exciter coil 113 may be rotationally symmetric so that eddy currents in the targets 121, 122 may not change versus rotation angle. If the self-inductance of the exciter coil 113 is Le and the self-inductances of the two targets are Lt1, Lt2, and if the mutual inductances between the exciter coil 113 and the first target 121 is Me1, and the mutual inductance between the exciter coil 113 and the second target 122 is Me2, and the mutual inductance between both targets 121, 122 is M12=sqrt(Lt1*Lt2)*ks, with ks small but close to 1 (good coupling between the target coils because they are close to each other), and if the current in the exciter coil 113 is Ie, the current in the first target 121 is I1 and the current in the second target 122 is I2, respectively, it holds (if we neglect all resistive losses)

$$It1 = Ie*(Me2*sqrt(Lt1) - Me1*sqrt(Lt2))/(2*(1-ks)*Lt1*sqrt(Lt2))$$

$$It2 = -Ie*(Me2*sqrt(Lt1) - Me1*sqrt(Lt2))/(2*(1-ks)*Lt1*sqrt(Lt1))$$

$$\text{Out}[35] = \left\{\left\{It1 \to \frac{Iew(-i\,Me1\,R3 + Lt2\,Me1\,w - M12\,Me2\,w)}{R2\,R3 + i(Lt2\,R2 + Lt1\,R3)w + (-Lt1\,Lt2 + M12^2)w^2},\right.\right.$$

$$\left.\left. It2 \to -\frac{Iew(i\,Me2\,R2 + M12\,Me1\,w - Lt1\,Me2\,w)}{R2\,R3 + i(Lt2\,R2 + Lt1\,R3)w + (-Lt1\,Lt2 + M12^2)w^2}\right\}\right\}$$

With reference to the embodiments shown in FIGS. 1, 2 and 4, an FEM simulation was conducted to prove the above mathematical theories underlying the herein described concept.

We consider an arrangement of type (i) "stacked in axial direction". In this FEM simulation, the exciter coil 113 has a diameter of 30 mm in z=0. The 3-fold target 121 in z=2.5 mm has an outer diameter of 26 mm and an inner diameter of 8.8 mm (edges smoothed out with 3 mm radius). The 4-fold target 122 in z=3.0 mm has an outer diameter of 26 mm and an inner diameter of 9.3 mm (edges smoothed out with 2 mm radius).

Results of the Simulation:
Le=104 nH, Lt1=109.7 nH, Lt2=102 nH, Me1=13.83 nH, Me2=15.4 nH, M12=18.96 nH
→It1/Ie=−0.1 and It2/Ie=−0.13

As expected, the current in the lower target 121 is larger, because it is closer to the exciter coil 113. The currents in the targets 121, 122 are about 10 times smaller than in the exciter coil 113.

(note: there is no inductive coupling of the targets 121, 122 with the pickup coils 111, 112 because the mutual inductances vanish)

If the targets 121, 122 were coils comprising wires being 20 um thick and 0.1 mm wide and made of copper, their resistance is roughly 0.8 Ohm. If we add these wire resistances into the calculation the currents are nearly the same. If we increase the numbers of turns per target coil 121, 122 the inductances rise $\sim n^2$ while the resistances rise only $\sim n \Rightarrow$ thus, we can suppress the resistances even more by increases the turn count.

If we again neglect the resistances and set M12=0 (i.e. no inductive coupling between the two targets 121, 122) we get: It1/Ie=−0.13 and It2/Ie=−0.15. This means that the inductive coupling of the two targets 121, 122 reduces the induced currents (and therefore also the voltages in the pickup coils 111, 112) by roughly 30%. However, the inductive angle sensor 100 provides for the additional feature of an unambiguous 360° angle detection.

Figure 7A:
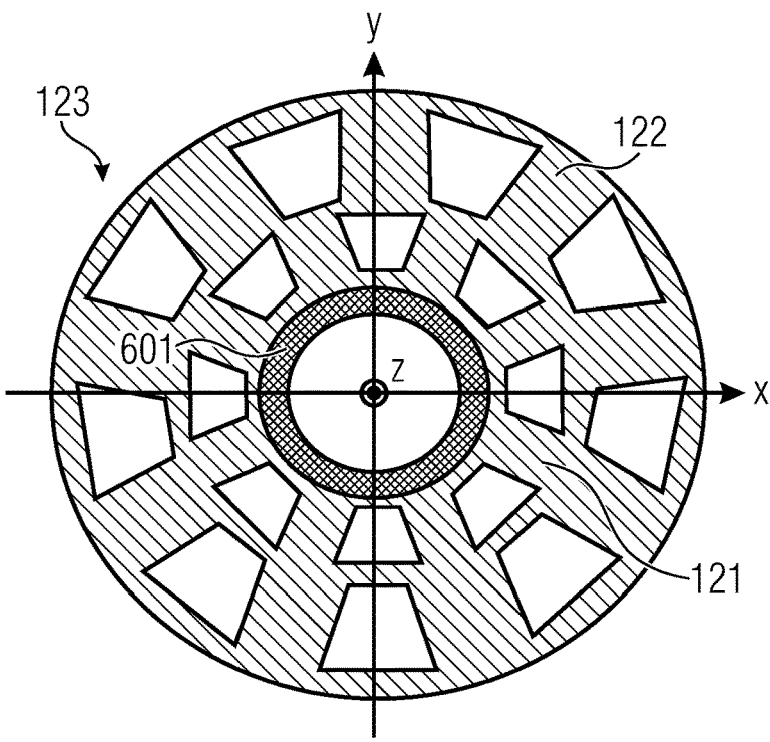
FIGS. 7A-7C show schematic top views a stator having an exciter coil and radially arranged first and second pickup coil arrangements.
Figure 7B:
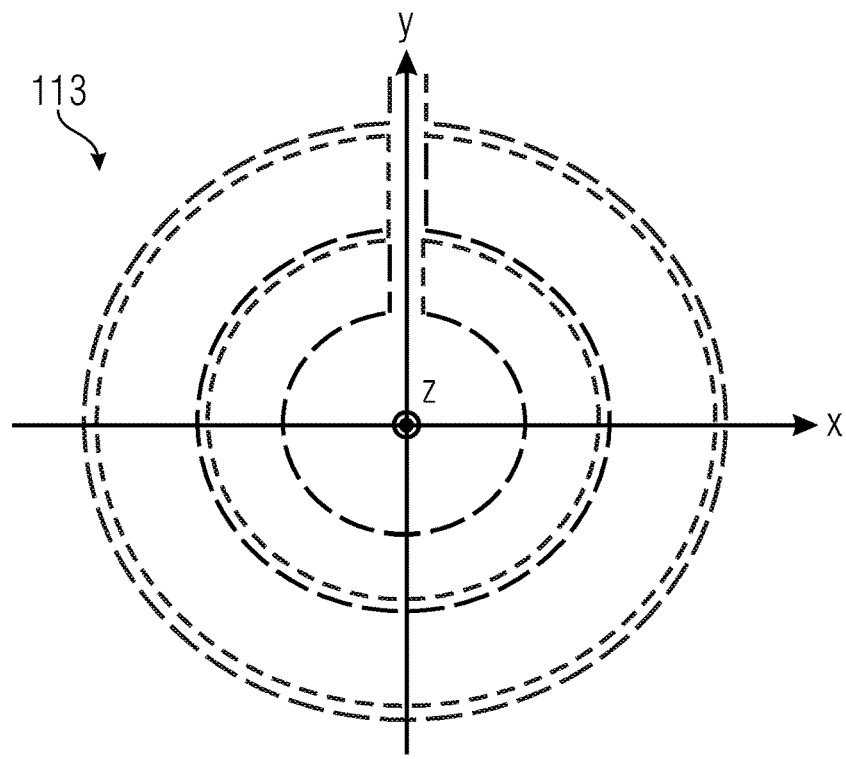
Figure 7C:
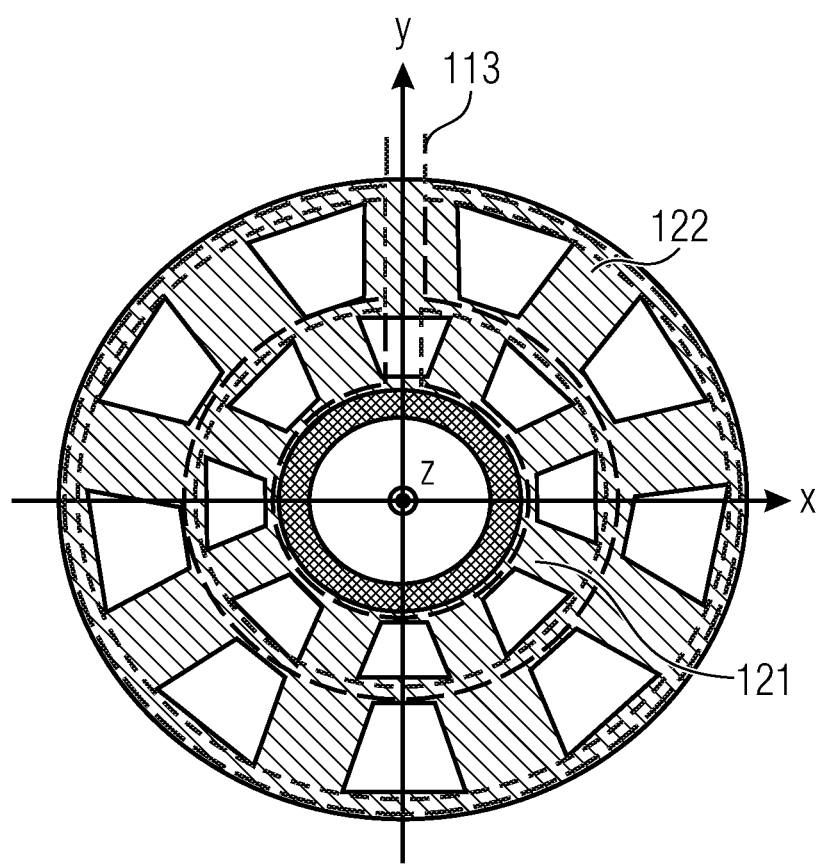

FIGS. 7A, 7B and 7C show an example of an inductive angle sensor 100 according to type (ii), i.e. with two targets 121, 122 being radially arranged. For example, as shown in FIG. 6A, the target arrangement 123 may be a thin circular metal plate with two rings of holes, wherein the first (inner) ring may provide the first target 121 and the second (outer) ring may provide the second target 122. The inner ring 121 may have 8-fold symmetry and the outer ring 122 may have 9-fold symmetry. The inner black ring 601 may be a flange to attach the target arrangement 123 to a rotatable shaft.

The corresponding exciter coil 113 may look like the one depicted in FIG. 7B. The current direction in the depicted two different branches (red and green) are identical, if they are neighboring circular arcs, and anti-parallel if they are neighboring radial segments. It is an advantage of this exciter coil 113 that it is a-static: it may generate antiparallel magnetic field on the inner and outer ring 121, 122 of the target arrangement 123. If one chooses the radii of the rings and the turn counts of the rings appropriately the total magnetic dipole moment of the exciter coil 113 can be made to vanish. Note that FIG. 6B shows only single loops per ring, but of course one may add several loops to each ring.

The exciter coil 113 and the target arrangement 123 may be aligned like depicted in the plan view shown in FIG. 7C.

Irrespective of whether the targets 121, 122 are arranged radially as in (ii) or axially like in the above described embodiments according to (i), hybrid embodiments (not explicitly shown) may be possible wherein one target, e.g. the first target 121, may be astatic and another target, e.g. the second target 122, may be non-astatic. For example, the astatic first target 121 may be implemented as an astatic conductor structure on a circuit board, e.g. a coil or a conductive trace on a PCB. The non-astatic second target 122 may, for instance, comprise a punched part made from metal, e.g. with alternating teeth and indentations. Alternatively, the non-astatic second target 122 may be provided as a perforated disc, or any other geometrical shape being non-astatic.

According to such a hybrid embodiment, the target arrangement 123 may be a combination of a non-astatic target 122 comprising a punched metal part and a circuit board, e.g. a PCB, wherein an astatic target 121 may be implemented on the circuit board. The punched metal part may be fixedly attached to the circuit board, e.g. by riveting, adhesive bonding, gluing, casting, molding or the like.

Additionally, or alternatively, the punched part made from metal may be press-fitted onto a rotor shaft for rotating the rotor 120 around the rotational axis 130. This would allow to easily attach the rotor 120 comprising the astatic and non-astatic targets 121, 122 to said rotor shaft. Accordingly, if the punched part made from metal is fixedly attached to the circuit board, said press-fitting may also allow to attach the circuit board (which may comprise an astatic target) to the rotor shaft.

If an astatic target may be combined with a non-astatic target in such an hybrid embodiment, it may be preferable to arrange the astatic target (in a vertical direction along the rotational axis 130) between the stator 110 and the non-astatic target. Otherwise, the non-astatic target may shield the AC magnetic fields of the exciter coil 113 from the astatic target.

The inductive angle sensor 100 according to the herein described innovative principle may provide the following advantages:

The inductive angle sensor 100 does not need more power than conventional sensors, because a single exciter coil 113 may work for both targets 121, 122.

The targets 121, 122 may also be cheap because it does not need two separate disks for the targets 121, 122 but both targets 121, 122 can be implemented on the very same disc. This makes it cheap and accurate and small.

There may be twice the detection effort for the local phase angles $\varphi_1$ and $\varphi_2$—but on the other hand one can use them as redundant systems with increased reliability.

One big advantage is that in the prior art one needs a system with 3-fold target and pick-up coil symmetry whenever a motor with 3 pole pairs has to be controlled—and it needs a 4-fold target with dedicated pick-up coil symmetry whenever a motor with 4 pole pairs has to be controlled. With the herein described innovative principle, one can manufacture one single inductive angle sensor 100 (e.g. with n=3 and m=4) to get a unique reading over full 360° which can serve all kinds of motors having an arbitrary number of pole pairs.

The target arrangement 123 comprises two targets 121, 122 that create fluxes with 360°/n periodicity and 360°/m periodicity.

The pickup coils 111, 112 may have the same periodicities and they may be astatic, thus the pickup coils 111, 112 may respond only to fluxes of their own periodicity, thus there is no crosstalk between the two sub-systems of periodicities 360°/n and 360°/m, and thus we do not need more space or power for two subsystems instead of one. We can use the nonius/Vernier principle.

The targets 121, 122 may be non-astatic, thus there may be a mutual inductance between both targets 121, 122.

As mentioned above, if the targets 121, 122 may be non-astatic, there may be a small mutual inductance between both targets 121, 122. Thus, the above described concept may be extended to a further embodiment, in which the rotor 120 may comprise one or more astatic targets 121, 122. For the definition of astatic, it is referred to the definition above with respect to the astatic pickup coils 111a, 111b, 112a, 112b. For example, an astatic target may be provided by means of astatic coils having windings as described above with respect to the astatic pickup coils 111a, 111b, 112a, 112b.

Figure 8:
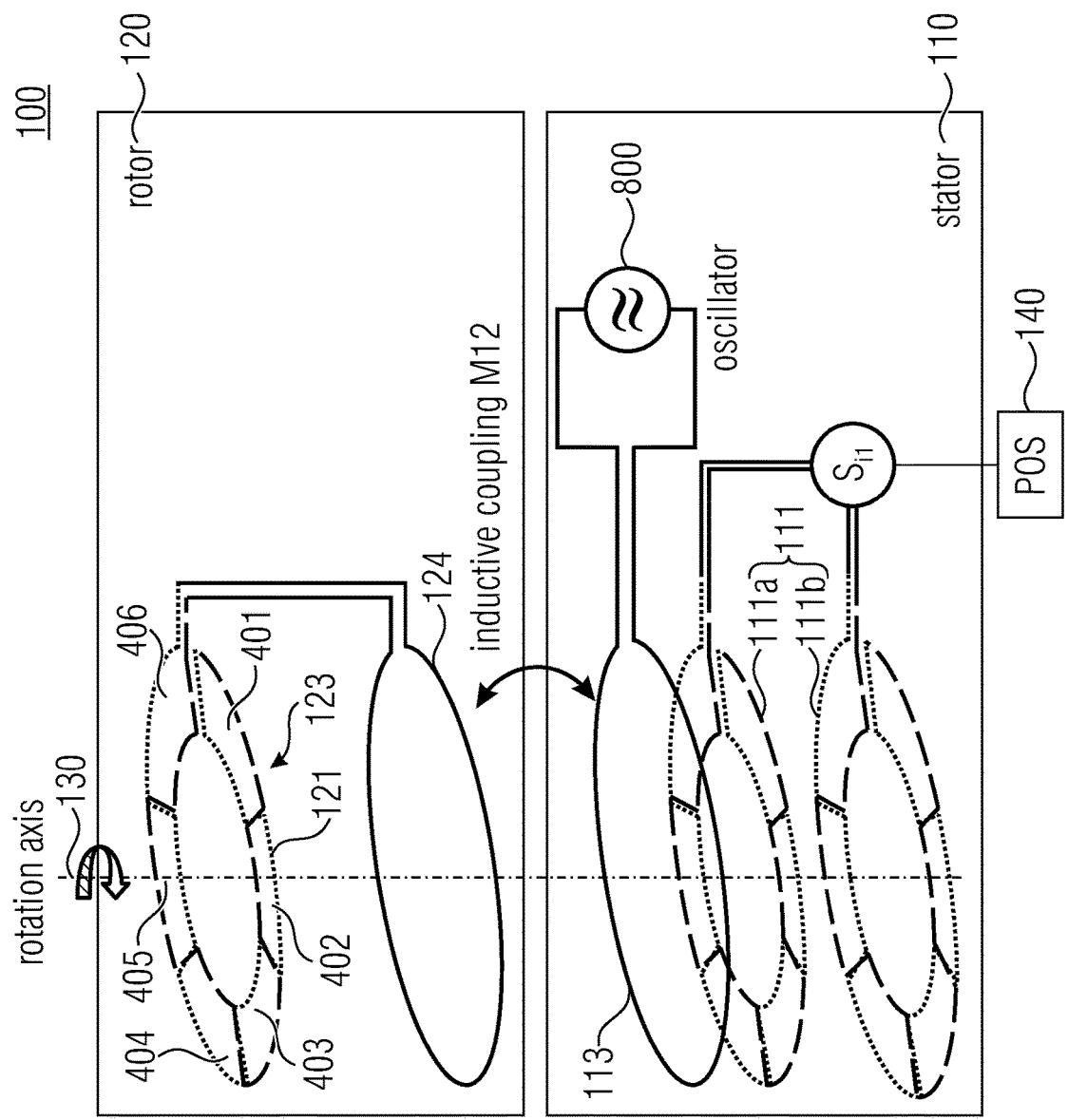
FIG. 8 shows a schematic view of an inductive angle sensor comprising an astatic target arrangement having a first conductive target according to an embodiment.

FIG. 8 shows an exemplary embodiment of an inductive angle sensor 100 comprising a rotor 120 having an astatic target arrangement 123 and comprising a stator 110 having an astatic pickup coil arrangement 111.

As can be seen, the stator 110 may comprise an exciter coil 113 and at least one pickup coil arrangement 111, the pickup coil arrangement 111 comprising an m-fold symmetry. In this example, the pickup coil arrangement 111 comprises a 3-fold symmetry with m=3. As described above, the pickup coil arrangement 111 may comprise a first pickup coil 111a (e.g. cosine) and a second pickup coil 111b (e.g. sine). The first and second pickup coils 111a, 111b may comprise an m-fold symmetry, e.g. a 3-fold symmetry. The first and second pickup coils 111a, 111b may be rotated around the rotation axis 130 relative to each other by 90°/m with m=3, for the 3-fold pickup coils.

The rotor 120 may comprise a target arrangement 123 comprising at least a first conductive target 121 having an m-fold symmetry corresponding to the m-fold symmetry of the at least one pickup coil arrangement 111. In this example, the first conductive target 121 has a 3-fold symmetry with m=3. Furthermore, according to this aspect, the target arrangement 123, and in particular the first conductive target 121, is astatic.

The rotor 120 may additionally comprise a secondary coil 124. The exciter coil 113 may serve as a matching primary coil. The exciter coil 113 may be fed with an alternating current, e.g. by an oscillator 800, for inductively coupling an induction current into the secondary coil 124, as shown with the double-headed arrow between primary and secondary coils 113, 124. The astatic coils (target and pick-up coils) do not have any mutual coupling to each other or to secondary and primary coils.

The secondary coil 124 may power the target arrangement 123. Therefore, the secondary coil 124 may be electrically coupled with the target arrangement 123, and in particular with the first conductive target 121, such that the induction current results in a magnetic flux with a periodicity of 360°/m in the first conductive target 121. The magnetic flux with the periodicity of 360°/m, in turn, induces an induced signal $S_{i1}$ in the at least one pickup coil arrangement 111 having the m-fold symmetry.

The inductive angle sensor 100 may further comprise a signal analysis device 140 for determining a rotational position of the rotor 120 based on the induced signal $S_{i1}$. Since the pickup coil arrangement 111 may comprise first and second pickup coils 111a, 111b, e.g. for generating cosine and sine signals as described above with reference to FIG. 3A, a local inductive angle φ'm may be computed as described above with reference to FIG. 3B. A mechanical rotational angle φ of the rotor 120 may then be computed from said local inductive angle φ'm.

The coupling between the exciter coil 113 (primary coil) and the secondary coil 124 is such that the electrical energy being coupled between both coils 113, 124 is substantially constant with respect to the position of the rotor 120. For example, the exciter coil 113 and the secondary coil 124 may comprise a circular shape. Additionally, or alternatively, the exciter coil 113 and the secondary coil 124 may be centered with respect to the rotational axis 130.

In the above described embodiments (FIGS. 1 to 7C) electric energy was transferred from the exciter coil 113 directly into the target arrangement 123. There it produced eddy currents with a specific angular pattern, namely with k-fold symmetry. The secondary magnetic field generated by these eddies created induced signals $S_{i1}$, $S_{i2}$ which were detected by pickup coil arrangements 111, 112 with the same angular k-fold symmetry.

The embodiment described with reference to FIG. 8 and following may split up the two actions "transfer of electrical energy between exciter coil 113 and target arrangement 123" and "generating an angular pattern of k-fold symmetry" into separate procedures executed by separate components. Then these components can be optimized for their single purpose and this increases the performance of the angle sensor 100.

As can be seen in FIG. 8, the first conductive target 121 may comprise a target coil comprising a number of 2*m loops 401 to 406 (here: 6 loops) arranged along a full revolution of 360° in a ring domain, wherein adjacent loops have an opposite winding direction.

Similar to the embodiments described above with respect to the astatic pickup coils 111, 112, the astatic target coil may comprise a first set of loops comprising all loops having a first revolution direction, and a second set of loops comprising all loops having an opposite second revolution direction. The first set of loops may span a first area and the second set of loops may span a second area, wherein the first and second areas of the target coil may be identical such that the conductive target 121 is astatic.

Additionally, the corresponding pickup coil arrangement 111 may optionally also be astatic, as described above. However, it may also be possible that the corresponding pickup coil arrangement 111 may be non-astatic. Furthermore, this embodiment comprising the astatic target arrangement 123 may also be combined with the above described Vernier principle.

Figure 9:
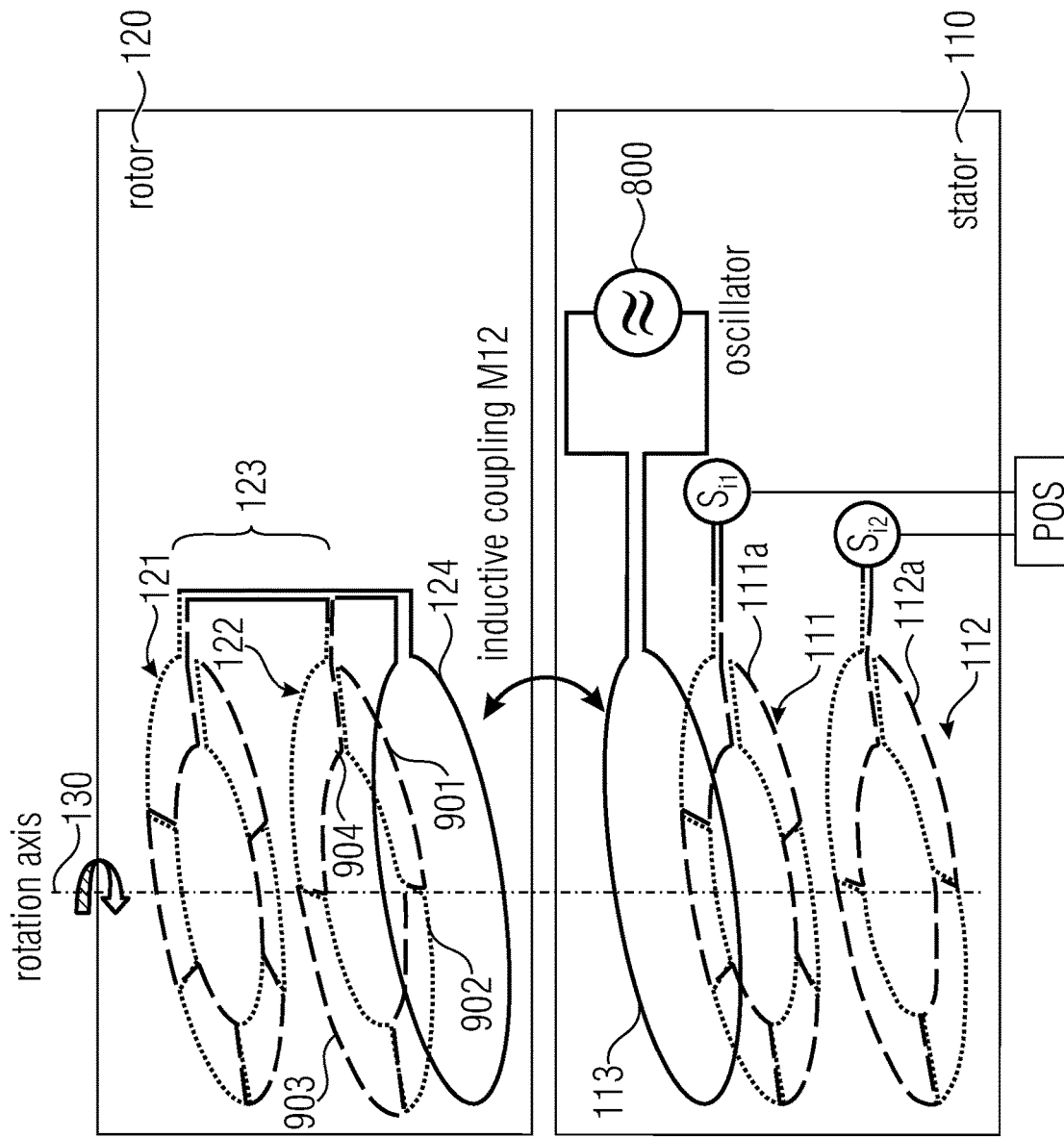
FIG. 9 shows a schematic view of an inductive angle sensor comprising an astatic target arrangement having first and second conductive targets according to an embodiment.

FIG. 9 shows an example of an inductive angle sensor 100 comprising an astatic target arrangement 123 comprising a first astatic conductive target 121 and a second astatic conductive target 122. The first and second astatic conductive targets 121, 122 may be vertically stacked along the rotational axis 130. Additionally, the angle sensor 100 may optionally comprise an astatic first pickup coil arrangement 111 and an astatic second pickup coil arrangement 112.

For the sake of visibility only the cosine pickup coils 111a, 112a of the first and second pickup coil arrangements 111, 112 are shown. In reality, there may be two more pickup coils as described in the embodiments above, namely the sine pickup coils 111b, 112b.

According to this exemplary embodiment, the stator 110 may comprise a second pickup coil arrangement 112 comprising an n-fold symmetry, wherein n is smaller than m, and preferably wherein m and n being different and do not have a common divisor except 1.

The target arrangement 123 may comprise a second conductive target 122 comprising an n-fold symmetry corresponding to the n-fold symmetry of the above mentioned second pickup coil arrangement 112.

The secondary coil 124 may be electrically coupled with the second conductive target 122 such that the induction current results in a magnetic flux with a periodicity of 360°/n in the second conductive target 122. The magnetic flux with the periodicity of 360°/n induces a further induced signal $S_{i2}$ in the second pickup coil arrangement 112 having the n-fold symmetry.

The signal analysis device 140 may be configured to determine a rotational position of the second conductive target 122 based on the further induced signal $S_{i2}$ induced in the second pickup coil arrangement 112.

The second conductive target 122 may be astatic. As can be seen, the second conductive target 122 may comprise a second target coil comprising a number of 2*n loops 901 to 904 arranged along a full revolution of 360° in a ring domain, wherein adjacent loops have an opposite winding direction.

The second target coil may comprise a first set of loops comprising all loops having a first revolution direction, and a second set of loops comprising all loops having an opposite second revolution direction. The first set of loops may span a first area and the second set of loops may span a second area, wherein the first and second areas of the second target coil may be identical such that the second conductive target 122 is astatic.

Additionally, the corresponding second pickup coil arrangement 112 may optionally also be astatic, as described above. However, it may also be possible that the corresponding second pickup coil arrangement 112 may be non-astatic.

As mentioned above, the target arrangement 123 of this embodiment may be astatic (=differential). In particular, at least one of the first and second conductive targets 121, 122 may be astatic. This means that any homogeneous magnetic field impinging on a conductive target 121, 122 gives zero net flux through it. If this field is time varying it induces no voltage in the target 121, 122. Moreover, the mutual inductance between both targets 121, 122 vanishes. Also the mutual inductance between any target 121, 122 and the secondary coil 124 vanishes. Also the mutual inductance between any target 121, 122 and the exciter coil 113 vanishes.

This is different from angle sensors without astatic targets, where any time a varying magnetic field impinges on the target it generates eddy currents in the target and where we would have an inductive coupling (i.e. a mutual inductance) between two nearby targets.

Since this embodiment has no inductive coupling between the two targets 121, 122, they do not interfere, i.e. there is no crosstalk between them. Furthermore, the astatic targets 121, 122 are less prone to external interference fields. If the astatic targets 121, 122 have a perfect geometry, the external interference fields would not generate any induction currents at all in the astatic targets 121, 122.

Since this embodiment has no inductive coupling between the primary coil 113 and any target coil 121, 122 the secondary coil 124 may take over this task, since the secondary coil 124 may have maximum inductive coupling to the primary coil 113. Accordingly, the secondary coil 124 may supply the targets 121, 122 with electrical energy.

According to an embodiment, the inductive coupling between the primary and secondary coils 113, 124 may be constant during rotation, i.e. their mutual inductance M12 may not depend on the rotation angle of the rotor 120. This assures that the targets 121, 122 are supplied with constant electrical energy for all rotational positions.

Another advantage of the astatic targets 121, 122 is the fact that they are more similar to the corresponding pickup coil arrangements 111, 112, which improves their inductive coupling.

As mentioned above, if the targets 121, 122 may comprise a coil, they may be made astatic by the shape of the windings of the coils. For example, in a target coil of n-fold symmetry the wires span 2*n loops which can be grouped in two sets. If we walk along the wire the area spanned by the loops is at the left hand side for loops of the first set and it is at the right hand side for loops of the second set. The coil is astatic if the sums of spanned areas of all loops of each set are identical. In an exemplary embodiment all loops may be identical in shape and rotated against each other by integer multiple of 180°/n for coils of n-fold symmetry and the loops are non-overlapping and neighboring loops may leave as small voids between them as possible. Thus the 2*n loops subtend nearly all 360° of a ring shaped region. Two neighboring loops can be grouped to a pair. Then we have n pairs. The two loops in each pair have equal area but opposite winding direction so that a homogeneous flux through both of them cancels out due to the different sign in each loop. In an exemplary embodiment all pairs may be identical in shape.

According to an embodiment, the target coils 121, 122 may be implemented as conductive traces on a PCB. Other manufacturing methods may provide sheet metals stamped or etched and stacked with interstitial isolation layers.

As mentioned above, the first and second conductive targets 121, 122 may be vertically stacked atop each other along the rotational axis 130. The vertical height of these vertically stacked targets 121, 122 may be very small, e.g. if the conductive targets 121, 122 may comprise or be provided as thin metal layers in a PCB, which metal layers may be distanced from each other in the range of tenths of millimeters.

As can be seen in FIG. 9, the target arrangement 123, and in particular both targets 121, 122, may be energized by the secondary coil 124. For example, both targets 121, 122 may be connected in series across the terminals of the secondary coil 124. Thus, the entire current, which is induced from the primary coil 113 in the secondary coil 124, also flows through both targets 121, 122. Alternatively, one may also connect the secondary coil 124 and the two targets 121, 122 in parallel. Then, the current supplied by the secondary coil 124 is split up between both targets 121, 122 according to their impedances.

However, the system can be much more complex. For example, an electronic circuit may be provided between the secondary coil 124 and the targets 121, 122.

Figure 10:
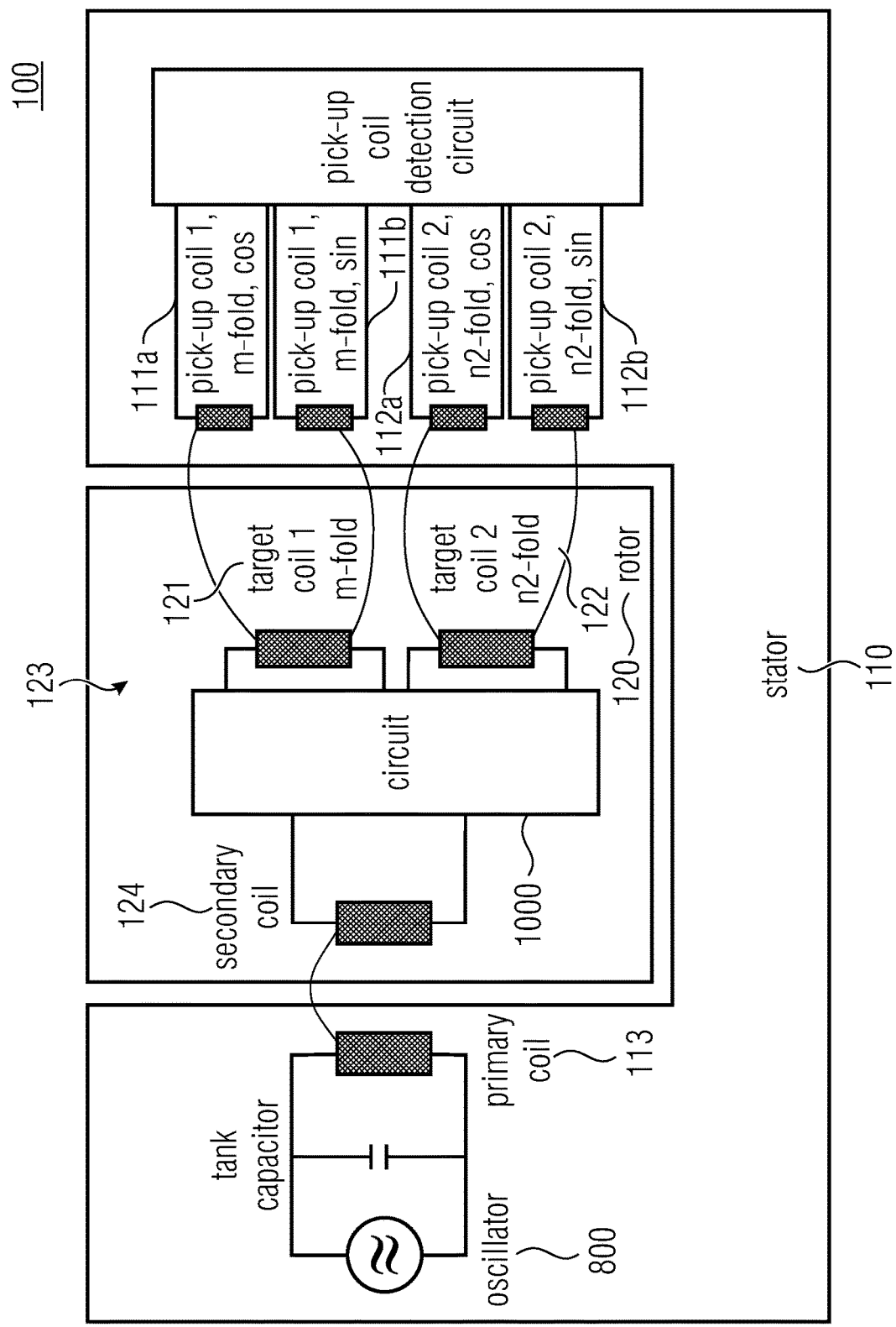
FIG. 10 shows a schematic block diagram of an angle sensor comprising an additional circuit on the stator according to an embodiment.

FIG. 10 shows an example of an inductive angle sensor 100 according to the innovative principle. According to this embodiment, the rotor 120 may further comprise a circuit 1000 being electrically connected between the secondary coil 124 and the target arrangement 123 for powering the target arrangement 123, wherein the circuit 1000 may be configured to manipulate the induction current received by the secondary coil 124 and to provide a manipulated current to the target arrangement 123.

The circuit 1000 may be mounted on the rotor 120 and it may receive its power by the secondary coil 124. The circuit 1000 may comprise a rectifier to convert the ac-power into dc voltage. It may also comprise phase locked loops or frequency dividers or an oscillator, bandgap circuits, power amplifiers, impedance matching structures. Thus, it may operate the targets 121, 122 with different frequency than the oscillator 800 in the stator 110 and also with different frequencies of the various targets 121, 122. This may be advantageous to further reduce inductive and/or capacitive crosstalk between exciter (primary) coil 113, targets 121, 122, and pickup coil arrangements 111, 112.

Summarizing, an inductive coupling between the stator 110 and the rotor 120 may be provided by the primary coil (exciter coil) 113 and the secondary coil 124. Since both the primary and the secondary coils 113, 124 may comprise a circular shape, there may be no dependence on the rotation angle. The targets 121, 122 may be powered by the secondary coil 124, in particular if the targets 121, 122 are astatic. In this case, there may be no inductive coupling between the targets 121, 122. Accordingly, the power efficiency of the inductive angle sensor 100 may be highly improved.

Accordingly, embodiments may provide an inductive angle sensor 100 comprising a secondary coil 124, optional circuitry, and one or more targets 121, 122 on a rotor 120. The inductive angle sensor 100 may further comprise a primary coil 113, and pickup coils 111, 112, and optional circuitry 1000 on a stator 110. The primary coil 113 may induce eddy currents/voltage in the secondary coil 124. The secondary coil 124 may supply a rotor circuit with power. The rotor circuit may comprise at least one target 121. The stator circuitry 1000 may detect voltage induced in the pickup coils 111, 112 in response to the magnetic field from the targets 111, 112. The stator circuitry 1000 may derive a rotational position of the rotor 120.

At least one of the exciter coil 113, the first conductive target 121, the second conductive target 122, the first pickup coil arrangement 111, the second pickup coil arrangement 112, the first pickup coil 111a, the second pickup coil 111b, the third pickup coil 112a and the fourth pickup coil 112b may comprise or be provided as a planar coil.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

For example, the following embodiments relate to methods of operating an inductive angle sensor as described herein.

In a first method-related embodiment, a method is suggested for operating an inductive angle sensor 100, the method comprising:

providing a stator 110 and a rotor 120 being rotationally movable relative to each other along a rotational axis 130, the stator 110 comprising an exciter coil 113, a first pickup coil arrangement 121 and a second pickup coil arrangement 122, wherein the first pickup coil arrangement 121 comprises an m-fold symmetry, and wherein the second pickup coil arrangement 122 comprises an n-fold symmetry, wherein m and n being different and do not have a common divisor except 1, wherein the rotor 120 comprises a target arrangement 123 comprising a first conductive target 121 and a second conductive target 122, the first and second conductive targets 121, 122 being vertically stacked along the rotational axis 130, the first conductive target 121 comprising an m-fold symmetry corresponding to the m-fold symmetry of the first pickup coil arrangement 111, and the second conductive target 122 comprising an n-fold symmetry corresponding to the n-fold symmetry of the second pickup coil arrangement 112, exciting the exciter coil 113 with an alternating current, the alternating current inducing a first induction current in the first conductive target 121 resulting in a first magnetic flux with a periodicity of 360°/m and inducing a second induction current in the second conductive target 122 resulting in a second magnetic flux with a periodicity of 360°/n, wherein the first magnetic flux with the periodicity of 360°/m induces a first induced signal $S_{i1}$ in the first pickup coil arrangement 111 having the m-fold symmetry and the second magnetic flux with the periodicity of 360°/n induces a second induced signal $S_{i2}$ in the second pickup coil arrangement 112 having the n-fold symmetry, and determining a rotational position of the rotor 120 based on the first and second induced signals $S_{i1}$, $S_{i2}$.

According to a second method-related embodiment being combinable with the first method-related embodiment, the method may comprise a step of determining a first angle φ'm based on the first induced signal $S_{i1}$ from the first conductive target 121, and to determine a second angle φ'n based on the second induced signal $S_{i2}$ from the second conductive target 122, and wherein the method comprises a further step of determining an unambiguous mechanical rotational angle φ of the rotor 120 relative to the stator 110 according to a Vernier principle as a function of the first and second angles φ'm, φ'n according to φ=f(φ'm,φ'n).

According to a third method-related embodiment, a method is suggested for operating an inductive angle sensor 100, the method comprising:

providing a stator 110 and a rotor 120 being rotationally movable relative to each other around a rotational axis 130, the stator 110 comprising an exciter coil 113 and at least one pickup coil arrangement 111 comprising an m-fold symmetry, the rotor 120 comprising a secondary coil 124 and a target arrangement 123 comprising at least a first conductive target 121 having an m-fold symmetry corresponding to the m-fold symmetry of the at least one pickup coil arrangement 111, exciting the exciter coil 113 with an alternating current for inductively coupling an induction current into the secondary coil 124, wherein the secondary coil 124 is electrically coupled with the target arrangement 123, and in particular with the first conductive target 121, such that the induction current results in a magnetic flux with a periodicity of 360°/m in the first conductive target 121, wherein the magnetic flux with the periodicity of 360°/m induces an induced signal $S_{i1}$ in the at least one pickup coil arrangement 111 having the m-fold symmetry, and determining a rotational position of the rotor 120 based on the induced signal S1, wherein the first conductive target 121 is astatic.

The above mentioned method-related embodiments are all combinable with the herein described further embodiments and features. In particular, the first and second method-related embodiments may be combined with the features as claimed in claims 1 to 17, while the third method-related embodiment may be combined with the features as claimed in claims 19 to 27.

While this disclosure has been described with reference to illustrative embodiments, this description is not intended to be construed in a limiting sense. Various modifications and combinations of the illustrative embodiments, as well as other embodiments of this disclosure, will be apparent to persons skilled in the art upon reference to the description. It is therefore intended that the appended claims encompass any such modifications or embodiments.

REFERENCE NUMERALS 100 inductive angle sensor
110 stator
111 first pickup coil arrangement
111a first pickup coil (cosine)
111b second pickup coil (sine)
112 second pickup coil arrangement
112a third pickup coil (cosine)
112b fourth pickup coil (sine)
113 exciter coil (primary coil)
120 rotor
121 first conductive target
122 second conductive target
123 target arrangement
124 secondary coil
130 rotational axis
140 signal analysis device
149 tooth
150 indentation
151 indentation
152 tooth 401 to 408 single loops
800 oscillator
901 to 904 single loops of astatic target
1000 circuit
$S_{i1}$ first induced signal
$S_{i2}$ second induced signal

What is claimed is:

1. An inductive angle sensor, comprising:
a stator and a rotor being rotationally movable relative to each other around a rotational axis,
the stator comprising an exciter coil, a first pickup coil arrangement, and a second pickup coil arrangement,
wherein the first pickup coil arrangement comprises an m-fold symmetry, and wherein the second pickup coil arrangement comprises an n-fold symmetry,
wherein m and n being different and do not have a common divisor except 1,
wherein the rotor comprises a target arrangement comprising a first conductive target and a second conductive target, the first and second conductive targets being vertically stacked along the rotational axis, the first conductive target comprising an m-fold symmetry corresponding to the m-fold symmetry of the first pickup coil arrangement, and the second conductive target comprising an n-fold symmetry corresponding to the n-fold symmetry of the second pickup coil arrangement,
wherein the exciter coil is excitable with an alternating current, the alternating current inducing a first induction current in the first conductive target resulting in a first magnetic flux with a periodicity of 360°/m and inducing a second induction current in the second conductive target resulting in a second magnetic flux with a periodicity of 360°/n,
wherein the first magnetic flux with the periodicity of 360°/m induces a first induced signal in the first pickup coil arrangement having the m-fold symmetry and the second magnetic flux with the periodicity of 360°/n induces a second induced signal in the second pickup coil arrangement having the n-fold symmetry; and
a signal analysis device configured to determine a rotational position of the rotor based on the first and the second induced signals.

2. The inductive angle sensor of claim 1,
wherein the first pickup coil arrangement comprises a first pickup coil and a second pickup coil, each of the first and the second pickup coils having an m-fold symmetry.

3. The inductive angle sensor of claim 2,
wherein each of the first pickup coil and the second pickup coil comprises a number of 2*m loops arranged along a full revolution of 360° in a ring domain, wherein adjacent loops have opposite winding directions.

4. The inductive angle sensor of claim 2,
wherein each of the first and second pickup coils comprises a first set of loops in which each loop comprises a first revolution direction and a second set of loops in which each loop comprises a second revolution direction opposite to the first revolution direction,
wherein the first set of loops spans a first area and wherein the second set of loops spans a second area, and
wherein the first and the second areas of the first pickup coil are identical such that the first pickup coil is astatic, or
wherein the first and the second areas of the second pickup coil are identical such that the second pickup coil is astatic.

5. The inductive angle sensor of claim 2,
wherein the first pickup coil and the second pickup coil are rotated relative to each other around the rotational axis by 90°/m.

6. The inductive angle sensor of claim 1,
wherein the second pickup coil arrangement comprises a first pickup coil and a second pickup coil, each of the first and the second pickup coils having an n-fold symmetry.

7. The inductive angle sensor of claim 6,
wherein each of the first pickup coil and the second pickup coil comprises a number of 2*n loops arranged along a full revolution of 360° in a ring domain, wherein adjacent loops have an opposite winding direction.

8. The inductive angle sensor of claim 6,
wherein each of the first and the second pickup coils comprises a first set of loops in which each loop comprises a first revolution direction and a second set of loops in which each loop comprises an opposite second revolution direction,
wherein the first set of loops spans a first area and wherein the second set of loops spans a second area, and
wherein the first and the second areas of the first pickup coil are identical such that the first pickup coil is astatic, or
wherein the first and the second areas of the second pickup coil are identical such that the second pickup coil is astatic.

9. The inductive angle sensor of claim 6,
wherein the first pickup coil and the second pickup coil are rotated relative to each other around the rotational axis by 90°/n.

10. The inductive angle sensor of claim 1,
wherein the exciter coil, the first pickup coil arrangement, and the second pickup coil arrangement are arranged on a common substrate.

11. The inductive angle sensor of claim 1,
wherein the first conductive target and the second conductive target are fixedly mounted on a common substrate being attached to a rotor shaft for rotating the rotor around the rotational axis.

12. The inductive angle sensor of claim 1,
wherein at least one of the first and the second conductive targets is implemented as a conductive trace on a substrate portion of the rotor.

13. The inductive angle sensor of claim 1,
wherein the first conductive target is made from sheet metal comprising a geometrical shape with an m-fold symmetry, or
wherein the second conductive target is made from sheet metal comprising a geometrical shape with an n-fold symmetry.

14. The inductive angle sensor of claim 1,
wherein at least one of the first conductive target and the second conductive target is astatic.

15. The inductive angle sensor of claim 1,
wherein a first one of the first and the second conductive targets is non-astatic and comprises a punched part made from metal, and a second one of the first and the second conductive targets is astatic and implemented as an astatic conductor structure on a circuit board.

16. The inductive angle sensor of claim 15,
wherein the circuit board is attached to the punched part made from metal, or
wherein the punched part made from metal is press-fitted onto a rotor shaft for rotating the rotor around the rotational axis.

17. The inductive angle sensor of claim 1,
wherein the first conductive target and the second conductive target are connected to a common electrical potential.

18. The inductive angle sensor of claim 1,
wherein the signal analysis device is configured to determine a first angle ($\varphi'm$) based on the first induced signal from the first conductive target, and to determine a second angle ($\varphi'n$) based on the second induced signal from the second conductive target, and
wherein the signal analysis device is further configured to determine an unambiguous mechanical rotational angle ($\varphi$) of the rotor relative to the stator according to a Vernier principle as a function of the first and second angles ($\varphi'm$, $\varphi'n$) according to $\varphi=f(\varphi'm, \varphi'n)$.

19. An inductive angle sensor, comprising:
a stator and a rotor being rotationally movable relative to each other along a rotational axis,
the stator comprising an exciter coil and at least one pickup coil arrangement comprising an m-fold symmetry,
the rotor comprising a secondary coil and a target arrangement comprising at least a first conductive target having an m-fold symmetry corresponding to the m-fold symmetry of the at least one pickup coil arrangement,
wherein the exciter coil is excitable with an alternating current for inductively coupling an induction current into the secondary coil,
wherein the secondary coil is electrically coupled with the first conductive target such that the induction current results in a magnetic flux with a periodicity of 360°/m in the first conductive target,
wherein the magnetic flux with the periodicity of 360°/m induces an induced signal in the at least one pickup coil arrangement having the m-fold symmetry; and
a signal analysis device configured to determine a rotational position of the rotor based on the induced signal,
wherein the first conductive target is astatic.

20. The inductive angle sensor of claim 19,
wherein the first conductive target comprises a target coil comprising a number of 2*m loops arranged along a full revolution of 360° in a ring domain, wherein adjacent loops have opposite winding directions.

21. The inductive angle sensor of claim 20,
wherein the target coil comprises a first set of loops in which each loop comprises a first revolution direction and a second set of loops in which each loop comprises an opposite second revolution direction,
wherein the first set of loops spans a first area and wherein the second set of loops spans a second area, and
wherein the first and the second areas of the target coil are identical such that the first conductive target is astatic.

22. The inductive angle sensor of claim 19,
wherein the at least one pickup coil arrangement is astatic.

23. The inductive angle sensor of claim 19,
wherein the stator comprises a second pickup coil arrangement comprising an n-fold symmetry, wherein n is smaller than m,
wherein the target arrangement comprises a second conductive target comprising an n-fold symmetry corresponding to the n-fold symmetry of the second pickup coil arrangement,
wherein the secondary coil is electrically coupled with the second conductive target such that the induction current results in a magnetic flux with a periodicity of 360°/n in the second conductive target,
wherein the magnetic flux with the periodicity of 360°/n induces a further induced signal in the second pickup coil arrangement having the n-fold symmetry,
wherein the signal analysis device is configured to determine a rotational position of the second conductive target based on the further induced signal induced in the second pickup coil arrangement, and
wherein the second conductive target is astatic.

24. The inductive angle sensor of claim 23,
wherein the second conductive target comprises a second target coil comprising a number of 2*n loops arranged along a full revolution of 360° in a ring domain, wherein adjacent loops have opposite winding directions.

25. The inductive angle sensor of claim 24,
wherein the second target coil comprises a first set of loops in which each loop comprises a first revolution direction and a second set of loops in which each loop comprises an opposite second revolution direction,
wherein the first set of loops spans a first area and wherein the second set of loops spans a second area, and
wherein the first and the second areas of the second target coil are identical such that the second conductive target is astatic.

26. The inductive angle sensor of claim 23,
wherein the second pickup coil arrangement is astatic.

27. The inductive angle sensor of claim 19,
wherein the rotor further comprises a circuit being electrically connected between the secondary coil and the target arrangement for powering the target arrangement, wherein the circuit is configured to manipulate the induction current received by the secondary coil and to provide a manipulated current to the target arrangement.

* * * * *